United States Patent
Kawakami et al.

(10) Patent No.: US 7,163,999 B2
(45) Date of Patent: Jan. 16, 2007

(54) RESIN PARTICLE AND METHOD FOR PREPARATION THEREOF

(75) Inventors: Kazuhito Kawakami, Ritto (JP); Hidetoshi Noda, Otsu (JP); Toshihiko Kinsho, Uji (JP); Masayuki Hatanaka, Nagaokakyo (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 10/517,971

(22) PCT Filed: Jun. 17, 2003

(86) PCT No.: PCT/JP03/07646

§ 371 (c)(1),
(2), (4) Date: Mar. 24, 2005

(87) PCT Pub. No.: WO03/106541

PCT Pub. Date: Dec. 24, 2003

(65) Prior Publication Data

US 2005/0165139 A1 Jul. 28, 2005

(30) Foreign Application Priority Data

Jun. 17, 2002 (JP) .............................. 2002-176485
Jul. 31, 2002 (JP) .............................. 2002-223889

(51) Int. Cl.
*C08F 6/00* (2006.01)

(52) U.S. Cl. ...................... 528/480; 106/417; 106/426; 106/482; 428/447

(58) Field of Classification Search ................ 106/417, 106/426, 482; 428/447; 528/480
See application file for complete search history.

(56) References Cited

U.S. PATENT DOCUMENTS

| | | | | |
|---|---|---|---|---|
| 5,399,618 A | * | 3/1995 | Jenkins et al. | ............... 524/817 |
| 5,679,451 A | * | 10/1997 | Kondo et al. | ............ 428/32.32 |
| 2005/0031871 A1 | * | 2/2005 | Kinsho et al. | ............... 428/402 |

FOREIGN PATENT DOCUMENTS

JP 63-025664 2/1988

* cited by examiner

*Primary Examiner*—Terressa Boykin
(74) *Attorney, Agent, or Firm*—Edwards Angell Palmer & Dodge LLP

(57) ABSTRACT

A method for preparing a resin particle having a large surface area and a shape factor (SF-1) of 110 to 800, which comprises a step of applying a shear force to an aqueous dispersion having a viscosity of 300 to 100,000 mPa·s formed by adding a thickener to an aqueous dispersion containing resin particles, and a subsequent step of decreasing the viscosity of the aqueous dispersion to 200 mPa·s or less by adding a viscosity decreasing agent as necessary. Resin particles obtained by the method can be used as additives for paint, additives for coating materials, powder coatings, additives for cosmetics, resins for slush molding, spacers for use in manufacturing electronic components or devices, standard particles for electronic measuring instruments, toners for electrophotography, toners for electrostatic recording, toners for electrostatic printing, and hot-melt adhesives.

9 Claims, No Drawings

RESIN PARTICLE AND METHOD FOR PREPARATION THEREOF

CROSS-REFERENCE TO RELATED APPLICATION(S)

This application is a §371 application of copending international patent application PCT/US20043/021378 which was filed on Jun. 17, 2003, which is incorporated by reference.

TECHNICAL FIELD

The present invention relates to a resin particle and method for preparation thereof. More particularly, the present invention relates to resin particles which can be of use as additives for paints, additives for coating materials, powder coatings, additives for cosmetics, resins for slush molding, spacers for manufacturing electronic components or devices such as liquid crystal displays, standard particles for electronic measuring instruments, toners for electrophotography, electrostatic recording, or electrostatic printing, hot-melt adhesives, other molding materials, and the like, and to method for preparing the same.

BACKGROUND ART

There are known resin particles prepared by a method in which a resin solution, obtained by dissolving a resin in a solvent, is dispersed in an aqueous medium under the presence of a dispersing (assistant) agent such as a surfactant or a water-soluble polymer and then the solvent is removed by heating or decompression (that is, by a method of suspending a resin solution in an aqueous medium: see Japanese Patent Laid-open No. Hei 9-34167, for example).

In general, as resin particles obtained by such a method of suspending a resin solution in an aqueous medium are spherical particles, such resin particles have a drawback that the fluidity thereof tends to become excessive and the surface area thereof is small. Therefore, in a case where the resin particles are used as an additive for paint, obtained paint has a problem that the kinematic viscosity thereof is lowered, resulting in poor coating properties. Further, in a case where the resin particles are used as a toner, there is a problem that cleaning of the toner with a cleaning blade is not satisfactorily carried out.

It is therefore an object of the present invention to provide a non-spherical resin particle (e.g., a spindle- or rod-shaped resin particle), and a method for preparing such resin particles.

DISCLOSURE OF THE INVENTION

The present inventors have earnestly studied to solve the above-described problem, thereby leading to the present invention. The present invention is a method for preparing resin particles, comprising a step of applying a shear force to an aqueous dispersion (II) with increased viscosity formed by adding a thickener (V) to an aqueous dispersion (I) containing resin particles (A) and a subsequent step of decreasing the viscosity of the aqueous dispersion by adding a viscosity decreasing agent (E) when it is required, and resin particles (B) obtained.

BEST MODE FOR CARRYING OUT THE INVENTION

In polyaddition reaction and curing reaction, a well-known catalyst or the like can be used.

A resin particle (A) to be used in the present invention comprises a resin (a). The resin (a) may be either a thermoplastic resin or a thermosetting resin, and examples of the resin (a) include vinyl resins, polyurethanes, epoxy resins, polyesters, polyamides, polyimides, silicone resins, phenolic resins, melamine resins, urea resins, aniline resins, ionomer resins, polycarbonates, and mixtures of two or more of them. Among them, from the viewpoint of obtaining uniform and fine spherical resin particles easily, vinyl resins, polyurethanes, epoxy resins, polyesters, and mixtures of two or more of them are preferred, vinyl resins, polyurethanes, polyesters, and mixtures of two or more of them are more preferred, and vinyl resins, polyesters, and mixtures of two or more of them are even more preferred.

Hereinbelow, these resins to be preferably used as the resin (a), that is, vinyl resins, polyurethanes, epoxy resins, and polyesters will be described, but the other resins mentioned above can also be used as the resin (a).

Vinyl resins are homopolymers or copolymers of vinyl monomers.

In polymerization, a well-known polymerization catalyst or the like can be used.

As vinyl monomers, the following compounds (1) to (10) can be used.

(1) Vinyl Hydrocarbons:

(1-1) Aliphatic Vinyl Hydrocarbons:
alkenes having 2 to 12 carbon atoms (e.g., ethylene, propylene, butene, isobutylene, pentene, heptene, diisobutylene, octene, dodecene, octadecene, and α-olefins having 3 to 24 carbon atoms); and alkadienes having 4 to 12 carbon atoms (e.g., butadiene, isoprene, 1,4-pentadiene, 1,6-hexadiene, and 1,7-octadiene).

(1-2) Alicyclic Vinyl Hydrocarbons:
mono- or di-cycloalkenes having 6 to 15 carbon atoms (e.g., cyclohexene, vinylcyclohexene, and ethylidenebicycloheptene); mono- or di-cycloalkadienes having 5 to 12 carbon atoms (e.g., (di)cyclopentadiene); terpenes (e.g., pinene, limonene, and indene); and the like.

(1-3) Aromatic Vinyl Hydrocarbons:
styrene; hydrocarbyl(alkyl, cycloalkyl, aralkyl, and/or alkenyl each having 1 to 24 carbon atoms)-substituted styrene (e.g., α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene); vinylnaphthalene; and the like.

(2) Carboxyl Group-containing Vinyl Monomers and Salts thereof:
unsaturated monocarboxylic acids having 3 to 30 carbon atoms (e.g., (meth)acrylic acid, crotonic acid, isocrotonic acid and cinnamic acid); unsaturated dicarboxylic acids having 3 to 30 carbon atoms or anhydrides thereof (e.g., maleic acid (anhydride), fumaric acid, itaconic acid, citraconic acid (anhydride), and mesaconic acid); monoalkyl (having 1 to 24 carbon atoms) esters of unsaturated dicarboxylic acids having 3 to 30 carbon atoms (e.g., monomethyl ester of maleic acid, monooctadecyl ester of maleic acid, monoethyl ester of fumaric acid, monobutyl ester of itaconic acid, glycol monoether of itaconic acid, and monoeicosyl ester of citraconic acid); and the like.

Examples of salts of the carboxyl group-containing vinyl monomers include alkali metal salts (e.g., sodium salts and potassium salts), alkaline-earth metal salts (e.g., calcium salts and magnesium salts), ammonium salts, amine salts, and quaternary ammonium salts. The amine salts are not limited to any specific ones as long as they are amine compounds, but primary amine salts (e.g., ethylamine salts, butylamine salts, and octylamine salts), secondary amine salts (e.g., diethylamine salts and dibutylamine salts), and tertiary amine salts (e.g., triethylamine salts and tributylamine salts) can be mentioned, for example. As the quaternary ammonium salts, tetraethylammonium salts, lauryltriethylammonium salts, tetrabutylammonium salts, lauryltributylammonium salts, and the like can be mentioned.

Specific examples of salts of the carboxyl group-containing vinyl monomers include sodium acrylate, sodium methacrylate, monosodium maleate, disodium maleate, potassium acrylate, potassium methacrylate, monopotassium maleate, lithium acrylate, cesium acrylate, ammonium acrylate, calcium acrylate, aluminum acrylate, and the like.

(3) Sulfo Group-containing Vinyl Monomers and Salts thereof:

alkenesulfonic acids having 2 to 14 carbon atoms (e.g., vinylsulfonic acid, (meth)allylsulfonic acid, and methylvinylsulfonic acid); styrenesulfonic acid and alkyl (having 2 to 24 carbon atoms) derivatives thereof (e.g., α-methylstyrenesulfonic acid); sulfo(hydroxy)alkyl-(meth)acrylates having 5 to 18 carbon atoms (e.g., sulfopropyl(meth)acrylate, 2-hydroxy-3-(meth)acryloxypropylsulfonic acid, 2-(meth)acryloyloxyethanesulfonic acid, and 3-(meth)acryloyloxy-2-hydroxypropanesulfoic acid); sulfo(hydroxy)alkyl(meth)acrylamides having 5 to 18 carbon atoms (e.g., 2-(meth)acryloylamino-2,2-dimethylethanesulfonic acid, 2-(meth)acrylamide-2-methylpropanesulfonic acid, and 3-(meth)acrylamide-2-hydroxypropanesulfonic acid); alkyl (having 3 to 18 carbon atoms) allylsulfosuccinic acids (e.g., propylallylsulfosuccinic acid, butylallylsulfosuccinic acid, and 2-ethylhexylallylsulfosuccinic acid); poly(n=2 to 30)oxyalkylene(oxyethylene, oxypropylene, oxybutylene: homo, random, or block)mono(meth)acrylate sulfates (e.g., poly(n=5 to 15)oxyethylene monomethacrylate sulfate and poly(n=5 to 15)oxypropylene monomethacrylate sulfate); polyoxyethylene polycyclic phenyl ether sulfates (e.g., sulfates represented by the general formula (1-1) or (1-2)); sulfonic acids represented by the general formula (1-3)); salts thereof; and the like.

It is to be noted that counter ions mentioned with reference to "(2) carboxyl group-containing vinyl monomers and salts thereof" or the like are used for the salts.

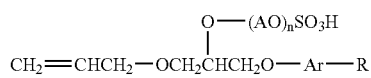 (1-1)

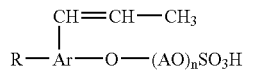 (1-2)

 (1-3)

wherein R represents an alkyl group having 1 to 15 carbon atoms, AO represents an oxyalkylene group having 2 to 4 carbon atoms, and wherein when n is plural, oxyalkylene groups may be the same or different, and when different, they may be random, block and/or combination of random and block, Ar represents a benzene ring, n is an integer of 1 to 50, and R' represents an alkyl group having 1 to 15 carbon atoms which may be substituted by a fluorine atom.

(4) Phosphono Group-containing Vinyl Monomers and Salts thereof:

(meth)acryloyloxyalkyl (having 1 to 24 carbon atoms) monophosphates (e.g., 2-hydroxyethyl(meth)acryloyl phosphate and phenyl-2-acryloyloxyethyl phosphate), and (meth)acryloyloxyalkyl (having 1 to 24 carbon atoms)phosphonic acids (e.g., 2-acryloyloxyethylphosphonic acid).

(5) Hydroxyl Group-containing Vinyl Monomers:

hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-butene-3-ol, 2-butene-1-ol, 2-butene-1,4-diol, propargyl alcohol, 2-hydroxyethyl propenyl ether, and allyl ether of sucrose, and the like.

(6) Nitrogen-containing Vinyl Monomers:

(6-1) Amino Group-containing Vinyl Monomers:

aminoethyl(meth)acrylate, dimethylaminoethyl (meth)acrylate, diethylaminoethyl(meth)acrylate, t-butylaminoethyl methacrylate, N-aminoethyl(meth)acrylamide, (meth)allylamine, morpholinoethyl(meth)acrylate, 4-vinylpyridine, 2-vinylpyridine, crotylamine, N,N-dimethylaminostyrene, methyl α-acetaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, aminomercaptothiazole, salts thereof, and the like.

(6-2) Amide Group-containing Vinyl Monomers:

(meth)acrylamide, N-methyl(meth)acrylamide, N-butylacrylamide, diacetoneacrylamide, N-methylol(meth)acrylamide, N,N'-methylene-bis(meth)acrylamide, cinnamamide, N,N-dimethylacrylamide, N,N-dibenzylacrylamide, methacryl formamide, N-methyl-N-vinylacetamide, and N-vinylpyrrolidone, and the like.

(6-3) Nitrile Group-containing Vinyl Monomers Having 3 to 10 Carbon Atoms:

(meth)acrylonitrile, cyanostyrene, cyanoacrylate, and the like.

(6-4) Quaternary Ammonium Cation Group-containing Vinyl Monomers:

quaternization products (obtained using a quaternizing agent such as methyl chloride, dimethyl sulfate, benzyl chloride, dimethyl carbonate or the like) of tertiary amine group-containing vinyl monomers such as dimethylaminoethyl (meth)acrylate, diethylaminoethyl(meth)acrylate, dimethylaminoethyl(meth)acrylamide, diethylaminoethyl (meth)acrylamide, diallylamine, and the like (e.g., dimethyldiallylammonium chloride and trimethylallylammonium chloride).

(6-5) Nitro Group-containing Vinyl Monomers Having 8 to 12 Carbon Atoms:

nitrostyrene and the like.

(7) Epoxy Group-containing Vinyl Monomers Having 6 to 18 Carbon Atoms:

glycidyl(meth)acrylate, tetrahydrofurfuryl(meth)acrylate, p-vinylphenyl oxide, and the like.

(8) Halogen-containing Vinyl Monomers Having 2 to 16 Carbon Atoms:

vinyl chloride, vinyl bromide, vinylidene chloride, allyl chloride, chlorostyrene, bromostyrene, dichlorostyrene, chloromethylstyrene, tetrafluorostyrene, chloroprene, and the like.

(9) Vinyl Esters, Vinyl(Thio)Ethers, Vinyl Ketones, and Vinyl Sulfones:

(9-1) Vinyl Esters Having 4 to 16 Carbon Atoms:

vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth)acrylate, vinyl methoxyacetate, vinyl benzoate, ethyl α-ethoxyacrylate, alkyl(meth)acrylates having an alkyl group containing 1 to 50 carbon atoms (e.g., methyl (meth)acrylate, ethyl(meth)acrylate, propyl(meth)acrylate, butyl (meth)acrylate, 2-ethylhexyl(meth)acrylate, dodecyl (meth)acrylate, hexadecyl(meth)acrylate, heptadecyl (meth)acrylate, and eicosyl(meth)acrylate), dialkyl fumarates (whose two alkyl groups are straight, branched or alicyclic groups having 2 to 8 carbon atoms), dialkyl maleates (whose two alkyl groups are straight, branched or alicyclic groups having 2 to 8 carbon atoms), poly (meth)allyloxyalkanes (e.g., diallyloxyethane, triallyloxyethane, tetraallyloxyethane, tetraallyloxypropane, tetraallyloxybutane, and tetramethallyloxyethane), vinyl-based monomers having a polyalkylene glycol chain [e.g., polyethylene glycol (molecular weight: 300) mono(meth) acrylate, polypropylene glycol (molecular weight: 500) monoacrylate, methyl alcohol-ethylene oxide (10 mol) adduct (meth)acrylate, and lauryl alcohol-ethylene oxide (30 mol) adduct (meth)acrylate], and poly(meth)acrylates (e.g., poly(meth)acrylates of polyhydric alcohols: ethylene glycol di(meth)acrylate, propylene glycol di(meth) acrylate, neopentyl glycol di(meth)acrylate, trimethylolpropane tri(meth)acrylate, and polyethylene glycol di(meth)acrylate), and the like.

(9-2) Vinyl(Thio)Ethers Having 3 to 16 Carbon Atoms:

vinyl methyl ether, vinyl ethyl ether, vinyl propyl ether, vinyl butyl ether, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxydiethyl ether, vinyl 2-ethylmercaptoethyl ether, acetoxystyrene, and phenoxystyrene, and the like.

(9-3) Vinyl ketones having 4 to 12 carbon atoms (e.g., vinyl methyl ketone, vinyl ethyl ketone, and vinyl phenyl ketone), vinyl sulfones having 2 to 16 carbon atoms (e.g., divinyl sulfide, p-vinyl diphenyl sulfide, vinyl ethyl sulfide, vinyl ethyl sulfone, divinyl sulfone, and divinyl sulfoxide), and the like.

(10) Other Vinyl Monomers:

isocyanatoethyl(meth)acrylate, m-isopropenyl-α, α-dimethylbenzyl isocyanate, and the like.

Among these vinyl monomers, vinyl hydrocarbons, carboxyl group-containing vinyl monomers and salts thereof, sulfonic acid group-containing vinyl monomers and salts thereof, hydroxyl group-containing vinyl monomers, and nitrogen-containing vinyl monomers are preferably used, more preferably, vinyl hydrocarbons, carboxyl group-containing vinyl monomers and salts thereof, and sulfonic acid group-containing vinyl monomers and salts thereof, even more preferably aromatic vinyl-based hydrocarbons, carboxyl group-containing vinyl monomers and salts thereof, and sulfonic acid group-containing vinyl monomers and salts thereof.

Among vinyl resins, as polymers obtained by copolymerizing vinyl monomers (copolymers of vinylmonomers), polymers obtained by copolymerizing two or more of the monomers mentioned in (1) to (10) in any ratio are used. Examples of such copolymers include styrene-(meth)acrylate copolymer, styrene-butadiene copolymer, (meth)acrylic acid-(meth)acrylate copolymer, styrene-acrylonitrile copolymer, styrene-maleic acid (anhydride) copolymer, styrene-(meth)acrylic acid copolymer, styrene-(meth)acrylic acid-divinylbenzene copolymer, and styrene-styrenesulfonic acid-(meth)acrylate copolymer, and the like.

As polyesters, polycondensation products of polyols with polycarboxylic acids, acid anhydrides thereof or lower alkyl esters thereof (alkyl groups having 1 to 4 carbon atoms), and the like can be used.

In polycondensation reaction, a well-known polycondensation catalyst or the like can be used.

As polyols, diols (11) and polyols (12) having 3 to 6 or more hydroxyl groups can be used.

As polycarboxylic acids, acid anhydrides thereof, and lower alkyl esters thereof, dicarboxylic acids (13), polycarboxylic acids (14) having 3 to 4 or more carboxyl groups, acid anhydrides thereof, and lower alkyl esters thereof can be used.

Examples of the diols (11) include alkylene glycols having 4 to 30 carbon atoms (e.g., ethylene glycol, 1,2-propylene glycol, 1,3-propylene glycol, 1,4-butanediol, 1,6-hexanediol, octanediol, decanediol, dodecanediol, tetradecanediol, neopentyl glycol, and 2,2-diethyl-1,3-propanediol), alkylene ether glycols having a molecular weight of 50 to 10,000 (e.g., diethylene glycol, triethylene glycol, dipropylene glycol, polyethylene glycol, polypropylene glycol, and polytetramethylene ether glycol), alicyclic diols having 6 to 24 carbon atoms (e.g., 1,4-cyclohexane dimethanol and hydrogenated bisphenol A), bisphenols having 15 to 30 carbon atoms (e.g., bisphenol A, bisphenol F, and bisphenol S), polyphenols having 12 to 24 carbon atoms (e.g., catechol, hydroquinone, and resorcin), alkylene oxides (hereinafter, simply referred to as "AO") [e.g., ethylene oxide, propylene oxide, and butylene oxide (hereinafter, simply referred to as "EO", "PO", and "BO", respectively)] (2 to 100 mol) adducts of the above-mentioned alicyclic diols having a molecular weight of 100 to 10,000 (e.g., EO (10 mol) adduct of 1,4-cyclohexane dimethanol), AO (EO, PO, or BO) (2 to 100 mol) adducts of the above-mentioned bisphenols (e.g., EO (2 mol) adduct of bisphenol A, EO (4 mol) adduct of bisphenol A, PO (2 mol) adduct of bisphenol A, PO (3 mol) adduct of bisphenol A, and PO (4 mol) adduct of bisphenol A), polylactonediols having a weight average molecular weight of 100 to 5,000 (e.g., poly-ε-caprolactonediol), polybutadienediol having a weight average molecular weight of 1,000 to 20,000, and the like.

Among these diols, alkylene glycols and AO adducts of bisphenols are preferably used, more preferably AO adducts of bisphenols and mixtures of AO adducts of bisphenols and alkylene glycols.

Examples of the polyols (12) having 3 to 6 or more hydroxyl groups include tri- to octa- or more polyhydric aliphatic alcohols having 3 to 8 carbon atoms (e.g., glycerin, trimethylolethane, trimethylolpropane, pentaerythritol, sorbitan, and sorbitol), trisphenols having 25 to 50 carbon atoms (e.g., trisphenol PA), novolac resins having a degree of polymerization of 3 to 50 (e.g., phenol novolac and cresol novolac), polyphenols having 6 to 30 carbon atoms (e.g., pyrogallol, phloroglucinol, and 1,2,4-benzenetriol), alkylene (having 2 to 4 carbon atoms) oxide (2 to 100 mol) adducts of the trisphenols mentioned above (e.g., EO (2 mol) adduct of trisphenol PA, EO (4 mol) adduct of trisphenol PA, PO (2 mol) adduct of trisphenol PA, PO (3 mol) adduct of trisphenol A, and PO (4 mol) adduct of trisphenol PA), alkylene (having 2 to 4 carbon atoms) oxide (2 to 100 mol) adducts of the novolac resins mentioned above (e.g., PO (2 mol) adduct of phenol novolac and EO (4 mol) adduct of phenol novolac), alkylene (having 2 to 4 carbon atoms) oxide (2 to 100 mol) adducts of the polyphenols mentioned above (e.g., EO (4 mol) adduct of pyrogallol), and acrylic polyols having a degree of polymerization of 20 to 2,000 (e.g., copolymers of hydroxyethyl(meth)acrylate with other vinyl monomers such as styrene, (meth)acrylic acid, and (meth)acrylate), and the like.

Among these polyols, polyhydric aliphatic alcohols and AO adducts of novolac resins are preferably used, more preferably AO adducts of novolac resins.

Examples of the dicarboxylic acids (13) include alkanedicarboxylic acids having 4 to 32 carbon atoms (e.g., succinic acid, adipic acid, sebacic acid, dodecenylsuccinic acid, azelaic acid, dodecanedicarboxylic acid, and octadecanedicarboxylic acid), alkenedicarboxylic acids having 4 to 32 carbon atoms (e.g., maleic acid, fumaric acid, citraconic acid, and mesaconic acid), branched-chain alkenedicarboxylic acids having 8 to 40 carbon atoms (e.g., dimer acid and alkenylsuccinic acids such as dodecenylsuccinic acid, pentadecenylsuccinic acid, and octadecenylsuccinic acid), branched-chain alkanedicarboxylic acids having 12 to 40 carbon atoms (e.g., alkylsuccinic acids such as decylsuccinic acid, dodecylsuccinic acid, and octadecylsuccinic acid), and aromatic dicarboxylic acids having 8 to 20 carbon atoms (e.g., phthalic acid, isophthalic acid, terephthalic acid, and naphthalenedicarboxylic acid), and the like.

Among these dicarboxylic acids (13), alkenedicarboxylic acids and aromatic dicarboxylic acids are preferably used, more preferably aromatic dicarboxylic acids.

Examples of the polycarboxylic acids (14) having 3 to 4 or more carboxyl groups include aromatic polycarboxylic acids having 9 to 20 carbon atoms, such as trimellitic acid, and pyromellitic acid, and the like.

Examples of acid anhydrides of the dicarboxylic acids (13) and the polycarboxylic acids (14) having 3 to 4 or more carboxyl groups include trimellitic anhydride and pyromellitic anhydride. Examples of lower alkyl esters thereof include methyl esters, ethyl esters, and isopropyl esters.

In forming the polyester to be used in the present invention, the diols, the polyols having 3 to 6 or more hydroxyl groups, the dicarboxylic acids, the polycarboxylic acids having 3 to 4 or more carboxyl groups, and mixtures of two or more of them can be used in any ratio. The equivalent ratio of hydroxyl group [OH] to carboxyl group [COOH], that is, [OH]/[COOH] is preferably in the range of 2/1 to 1/1, more preferably in the range of 1.5/1 to 1/1, even more preferably in the range of 1.3/1 to 1.02/1.

Further, the ester equivalent (that is, a molecular weight per one equivalent of ester group) in the polyester is preferably in the range of 50 to 2,000, more preferably in the range of 60 to 1,000, even more preferably in the range of 70 to 500.

As polyurethanes, polyaddition products of polyisocyanates (15) and active hydrogen-containing compounds (β1) (e.g., water, the diols (11), the polyols (12) having 3 to 6 or more hydroxyl groups, the dicarboxylic acids (13), the polycarboxyic acids (14) having 3 to 4 or more carboxyl groups, polyamines (16), and polythiols (17)), and the like can be used.

In polyaddition reaction, a well-known polyaddition reaction catalyst or the like can be used.

Examples of the polyisocyanates (15) include aromatic polyisocyanates having 6 to 20 carbon atoms (exclusive of the carbon in an NCO group; the same applies to the following description), aliphatic polyisocyanates having 2 to 18 carbon atoms, alicyclic polyisocyanates having 4 to 15 carbon atoms, araliphatic polyisocynates having 8 to 15 carbon atoms, and modification products of these polyisocyanates (e.g., modified polyisocyanates having urethane, carbodiimide, allophanate, urea, biuret, urethodione, urethoimine, isocyanurate, or oxazolidone groups), mixtures of two or more of them, and the like.

Examples of the aromatic polyisocyanates include 1,3- or 1,4-phenylene diisocyanate, 2,4- or 2,6-tolylene diisocyanate (TDI), crude TDI, 2,4'- or 4,4'-diphenylmethane diisocyanate (MDI), crude MDI [phosgenide of crude diaminophenylmethane [a condensation product of formaldehyde with aromatic amine (aniline) or a mixture containing such aromatic amine; a mixture of diaminodiphenylmethane and a small amount (e.g., 5 to 20%) of polyamine having 3 or more amino groups]: polyallyl polyisocyanate (PAPI)], 1,5-naphthylene diisocyante, 4,4',4''-triphenylmethane triisocyanate, m- or p-isocyanatophenylsulfonyl isocyanate, mixtures of two or more of them, and the like. It should be noted that all "%" in this specification are by weight, unless otherwise specified.

Examples of the aliphatic polyisocyanates include ethylene diisocyanate, tetramethylene diisocyanate, hexamethylenediisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl)carbonate, 2-isocyanatoethyl-2,6-diisocyanatohexanoate, mixtures of two or more of them, and the like.

Examples of the alicyclic polyisocyanates include isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- or 2,6-norbornane diisocyanate, mixtures of two or more of them, and the like.

Examples of the araliphatic polyisocyanates include m- or p-xylylene diisocyanate (XDI), α,α,α',α'-tetramethylxylylene diisocyanate (TMXDI), mixtures of two or more of them, and the like.

Examples of the modification products of polyisocyanates include modified polyisocyanates having urethane, carbodiimide, allophanate, urea, biuret, urethodione, urethoimine, isocyanurate and/or oxazolidone groups, such as modified MDI (e.g., urethane-modified MDI, carbodiimide-modified MDI, and trihydrocarbyl phosphate-modified MDI), urethane-modified TDI, mixtures of two or more of them [e.g., a mixture of the modified MDI and the urethane-modified TDI (isocyanate-containing prepolymer)], and the like.

Among these polyisocyanates, aromatic polyisocyanates, aliphatic polyisocyanates, and alicyclic polyisocyanates are preferably used, more preferably TDI, MDI, HDI, hydrogenated MDI, and IPDI.

As polyamines (16), aliphatic polyamines having 2 to 18 carbon atoms, aromatic polyamines having 6 to 20 carbon atoms, and the like can be used.

As aliphatic polyamines having 2 to 18 carbon atoms, (1) aliphatic polyamines, (2) alkyl (having 1 to 4 carbon atoms)- or hydroxyalkyl (having 2 to 4 carbon atoms)-substituted aliphatic polyamines mentioned above, (3) alicyclic or heterocycle-containing aliphatic polyamines, (4) aromatic ring-containing aliphatic amines having 8 to 15 carbon atoms, and the like can be used.

(1) Examples of the aliphatic polyamines include alkylenediamines having 2 to 12 carbon atoms (e.g., ethylenediamine, propylenediamine, trimethylenediamine, tetramethylenediamine, and hexamethylenediamine), polyalkylene (having 2 to 6 carbon atoms) polyamines [e.g., diethylenetriamine, iminobispropylamine, bis(hexamethylene)tri-amine, triethylenetetramine, tetraethylenepentamine, and pentaethylenehexamine], and the like.

(2) Examples of the alkyl (having 1 to 4 carbon atoms)- or hydroxyalkyl (having 2 to 4 carbon atoms)-substituted aliphatic polyamines mentioned above include dialkyl (having 1 to 3 carbon atoms) aminopropylamine, trimethylhexamethylenediamine, aminoethylethanolamine, 2,5-dimethyl-2,5-hexamethylenediamine, and methyliminobispropylamine, and the like.

(3) Examples of the alicyclic or heterocycle-containing aliphatic polyamines include alicyclic polyamines having 4 to 15 carbon atoms {e.g., 1,3-diaminocyclohexane, isophoronediamine, menthenediamine, 4,4'-methylenedicyclohexanediamine (hydrogenated methylenedianiline), and 3,9-bis (3-aminopropyl)-2,4,8,10-tetraoxaspiro[5,5]undecane}, and heterocyclic polyamines having 4 to 15 carbon atoms [e.g., piperazine, N-aminoethylpiperazine, 1,4-diaminoethylpiperazine, and 1,4-bis(2-amino-2-methylpropyl)piperazine], and the like.

(4) Examples of the aromatic ring-containing aliphatic amines (having 8 to 15 carbon atoms) include xylylenediamine, tetrachloro-p-xylylenediamine, and the like.

As the above-mentioned aromatic polyamines having 6 to 20 carbon atoms, (1) unsubstituted aromatic polyamines, (2) aromatic polyamines nuclearly substituted by one or more alkyl groups (having 1 to 4 carbon atoms, such as methyl, ethyl, n- or i-propyl and butyl), (3) aromatic polyamines having one or more electron-attracting groups such as halogen (e.g., Cl, Br, I, and F), alkoxy groups (e.g., methoxy and ethoxy), and a nitro group as nuclear substituents, and (4) secondary amino group-containing aromatic polyamines, and the like can be used.

(1) Examples of the unsubstituted aromatic polyamines include 1,2-, 1,3- or 1,4-phenylenediamine, 2,4'- or 4,4'-diphenylmethanediamine, crude diphenylmethanediamine (polyphenylpolymethylenepolyamine), diaminodiphenyl sulfone, benzidine, thiodianiline, bis(3,4-diaminophenyl) sulfone, 2,6-diaminopyridine, m-aminobenzylamine, triphenylmethane-4,4',4"-triamine, naphthylenediamine, mixtures of two or more of them, and the like.

(2) Examples of the aromatic polyamines nuclearly substituted by one or more alkyl groups having 1 to 4 carbon atoms, such as methyl, ethyl, n- or i-propyl and butyl include 2,4- or 2,6-tolylenediamine, crude tolylenediamine, diethyltolylenediamine, 4,4'-diamino-3,3'-dimethyldiphenylmethane, 4,4'-bis(o-toluidine), dianisidine, diaminoditolyl sulfone, 1,3-dimethyl-2,4-diaminobenzene, 1,3-diethyl-2,4-diaminobenzene, 1,3-dimetnyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3, 5-triisopropyl-2,4-diaminobenzene, 1-methyl-3,5-diethyl-2, 4-diaminobenzene, 1-methyl-3,5-diethyl-2,6-diaminobenzene, 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, 3,3'5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenyl ether, 3,3',5,5'-tetraisopropyl-4,4'-diaminodiphenyl sulfone, mixtures of two or more of them, and the like.

(3) Examples of the aromatic polyamines having one or more electron-attracting groups such as halogen (e.g., a chlorine atom, a bromine atom, an iodine atom, and a fluorine atom), alkoxy groups (e.g., methoxy and ethoxy), and a nitro group as nuclear substituents include methylenebis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline, 4,4'-diamino-3,3'-dimethyl-5, 5'-dibromo-diphenylmethane, 3,3'-dichlorobenzidine, 3,3'-dimethoxybenzidine, bis(4-amino-3-chlorophenyl)oxide, bis(4-amino-2-chlorophenyl)propane, bis(4-amino-2-chlorophenyl)sulfone, bis(4-amino-3-methoxyphenyl)decane, bis(4-aminophenyl)sulfide, bis(4-aminophenyl)telluride, bis (4-aminophenyl)selenide, bis(4-amino-3-methoxyphenyl) disulfide, 4,4'-methylenebis(2-iodoaniline), 4,4'-methylenebis(2-bromoaniline), 4,4'-methylenebis(2-fluoroaniline), 4-aminophenyl-2-chloroaniline, and the like.

(4) Examples of the secondary amino group-containing aromatic polyamines include: aromatic polyamines obtained by replacing some or all of —NH$_2$ groups in the aromatic polyamines (1) to (3) with —NH—R' groups (wherein R' represents an alkyl group such as a lower alkyl group having 1 to 4 carbon atoms e.g., methyl, ethyl, or the like), such as 4,4'-di(methylamino)diphenylmethane, and 1-methyl-2-methylamino-4-aminobenzene, and the like; polyamide polyamines such as low molecular-weight polyamide polyamines obtained by condensation of dicarboxylic acids (e.g., dimer acid) with excess (that is, 2 or more mols per mol of the acid) polyamines (e.g., the alkylenediamines and the polyalkylenepolyamines mentioned above); polyether polyamines such as hydrides of cyanoethylation products of polyether polyols (e.g., polyalkylene glycol); and the like.

As polythiols (17), dithiols having 2 to 24 carbon atoms, tri- to hexa- or higher valent polythiols having 5 to 30 carbon atoms, and the like can be used.

Examples of dithiols include ethylenedithiol, 1,4-butanedithiol, 1,6-hexanedithiol, and the like.

Examples of polythiols include Capcure-3800 (manufactured by Japan Epoxy Resins Co., Ltd.), polyvinylthiol, and the like.

Among these active hydrogen-containing compounds (β1), water, the diols (11), the polyols (12), the dicarboxylic acids (13), and the polyamines (16) are preferably used, more preferably water, the diols (11), the polyols (12), and the polyamines (16), even more preferably the diols (11), the polyols (12), and the polyamines (16).

As epoxy resins, ring-opening polymerization products of polyepoxides (18), polyaddition products of the polyepoxides (18) and the active hydrogen-containing compounds (β1), and curing reaction products of the polyepoxides (18) and acid anhydrides of the dicarboxylic acids (13) or the polycarboxylic acids (14) having 3 to 4 or more carboxyl groups, and the like can be used.

In ring-opening polymerization reaction, polyaddition reaction, and curing reaction, a well-known catalyst or the like can be used.

The polyepoxide (18) is not limited to any specific one as long as it has two or more epoxy groups in the molecule, but from the viewpoint of mechanical characteristics of the cured product, it preferably has 2 to 6 epoxy groups in the molecule.

The epoxy equivalent (that is, molecular weight per epoxy group) of the polyepoxide (18) is preferably in the range of 65 to 1,000. The upper limit is more preferably 500, even more preferably 300. The lower limit is more preferably 70, even more preferably 90. If the epoxy equivalent exceeds the above upper limit, the cross-linked structure tends to be loose, thus resulting in lowering of physical properties of the cured product, such as water resistance, chemical resistance, mechanical strength, and the like. On the other hand, it is difficult to get (or synthesize) polyepoxides having an epoxy equivalent less than the above lower limit.

As polyepoxides (18), aromatic polyepoxides, heterocycle-containing polyepoxides, alicyclic polyepoxides, aliphatic polyepoxides, and the like can be used.

As aromatic polyepoxides, glycidyl ethers of polyhydric phenols, glycidyl esters of polyhydric phenols, glycidyl aromatic polyamines, and glycidylation products of aminophenols, and the like can be used.

Examples of the glycidyl ethers of polyhydric phenols include bisphenol F diglycidyl ether, bisphenol A diglycidyl ether, bisphenol B diglycidyl ether, bisphenol AD diglycidyl ether, bisphenol S diglycidyl ether, bisphenol A diglycidyl halides, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthalene diglycidyl ether, dihydroxybiphenyl diglycidyl ether, octachloro-4,4'-dihydroxybiphenyl diglycidyl ether, tetramethylbiphenyl diglycidyl ether, dihydroxynaphthylcresol triglycidyl ether, tris(hydroxyphenyl)methanetriglycidyl ether, dinaphthyltriol triglycidyl ether, tetrakis(4-hydroxyphenyl)ethane tetraglycidyl ether, p-glycidylphenyldimethyltolyl bisphenol A glycidyl ether, trismethyl-tert-butyl-butylhydroxymethane triglycidyl ether, 9,9'-bis(4-hydroxyphenyl)fluorene diglycidyl ether, 4,4'-oxybis(1,4-phenylethyl)tetracresol glycidyl ether, 4,4'-oxybis(1,4-phenylethyl)phenyl glycidyl ether, bis(dihydroxynaphthalene)tetraglycidyl ether, glycidyl ether of phenol or cresol novolac resin, glycidyl ether of limonene phenol novolac resin, diglycidyl ether obtained by the reaction between 2 mols of bisphenol A and 3 mols of epichlorohydrin, polyglycidyl ethers of polyphenols obtained by condensation reaction of phenol with glyoxal, glutaraldehyde, or formaldehyde, polyglycidyl ether of polyphenol obtained by condensation reaction of resorcin with acetone, and the like.

Examples of the glycidyl esters of polyhydric phenols include diglycidyl phthalate, diglycidyl isophthalate, diglycidyl terephthalate, and the like.

Examples of the glycidyl aromatic polyamines include N,N-diglycidylaniline, N,N,N',N'-tetraglycidylxylylenediamine, and N,N,N',N'-tetraglycidyldiphenylmethanediamine, and the like.

Further, the epoxides include: triglycidyl ether of p-aminophenol; diglycidyl urethane compounds obtained by the addition reaction of tolylene diisocyanate or diphenylmethane diisocyanate and glycidol; and diglycidyl ethers of AO (EO or PO) (2 to 20 mol) adducts of bisphenol A (e.g., diglycidyl ether of EO (4 mol) adduct of bisphenol A).

As heterocyclic polyepoxides, trisglycidylmelamine can be used.

As alicyclic polyepoxides, vinylcyclohexene dioxide, limonene dioxide, dicyclopentadiene dioxide, bis(2,3-epoxycyclopentyl)ether, ethylene glycol bisepoxydicyclopentyl ether, 3,4-epoxy-6-methylcyclohexylmethyl-3',4'-epoxy-6'-methylcyclohexanecarboxylate, bis(3,4-epoxy-6-methylcyclohexylmethyl) adipate, bis(3,4-epoxy-6-methylcyclohexylmethyl)butylamine, dimer acid diglycidyl ester, and nuclear hydrogenation products of aromatic polyepoxides (e.g., hydrogenated bisphenol F diglycidyl ether and hydrogenated bisphenol A diglycidyl ether) can be used, for example.

As aliphatic polyepoxides, polyglycidyl ethers of polyhydric aliphatic alcohols, polyglycidyl esters of polyvalent fatty acids, glycidyl aliphatic amines, and the like can be used.

Examples of the polyglycidyl ethers of polyhydric aliphatic alcohols include ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, polyglycerol polyglycidyl ether, and the like.

Examples of the polyglycidyl esters of polyvalent fatty acids include diglycidyl oxalate, diglycidyl maleate, diglycidyl succinate, diglycidyl glutarate, diglycidyl adipate, diglycidyl pimelate, and the like.

Examples of the glycidyl aliphatic amines include N,N,N',N'-tetraglycidyl hexamethylenediamine, and N,N,N',N'-tetraglycidyl ethylenediamine, and the like.

The aliphatic polyepoxides include (co)polymers of diglycidyl ethers and glycidyl(meth)acrylates.

Among these polyepoxides, aliphatic polyepoxy compounds and aromatic polyepoxy compounds are preferably used. In the present invention, the polyepoxides may be used in combination of two or more of them.

The resin (a) constitutes a resin particle (B). The number average molecular weight (Mn), Tg, melting point, and SP value of the resin (a) can be appropriately adjusted to a value within a preferred range according to the purpose of use of the resin particles (B).

For example, in a case where the resin particles (B) are to be used as a resin for slush molding or a powder coating material, the Mn of the resin (a) is preferably in the range of 2,000 to 500,000, more preferably in the range of 2,500 to 200,000, even more preferably in the range of 4,000 to 100,000.

In this regard, it should be noted that the number average molecular weights (Mn) and weight average molecular weights (Mw) in this specification were measured by gel permeation chromatography (GPC) (using a THF solvent and polystyrene as a standard substance).

Further, in a case where the resin (a) has a melting point, the melting point of the resin (a) is preferably in the range of 0 to 250° C., more preferably in the range of 35 to 200° C., even more preferably in the range of 40 to 180° C.

In this regard, it should be noted that the melting points in this specification were measured by DSC (differential scanning calorimeter) at a temperature rising rate of 20° C./min.

Furthermore, the Tg of the resin (a) is preferably in the range of −60 to 100° C., more preferably in the range of −40 to 80° C., even more preferably in the range of −30 to 70° C.

In this regard, it should be noted that the values of Tg in this specification were determined by DSC.

Moreover, the SP value of the resin (a) is preferably in the range of 7 to 18, more preferably in the range of 8 to 16, even more preferably in the range of 9 to 14.

In this regard, it should be noted that the SP values were calculated according to a method described in Polymer Engineering and Science, February 1974, Vol. 14, No. 2, pp. 147 to 154.

In a case where the resin particles (B) are to be used as a spacer for use in manufacturing electronic components or devices such as liquid crystal displays or as standard particles for electronic measuring instruments, the Mn of the resin (a) is preferably in the range of 10,000 to 10,000,000, more preferably in the range of 15,000 to 2,000,000, even more preferably in the range of 20,000 to 1,000,000.

Further, in a case where the resin (a) has a melting point, the melting point of the resin (a) is preferably in the range of 50 to 300° C., more preferably in the range of 80 to 250° C., even more preferably in the range of 100 to 240° C.

Furthermore, the Tg of the resin (a) is preferably in the range of 0 to 250° C., more preferably in the range of 20 to 200° C., even more preferably in the range of 35 to 150° C.

Moreover, the SP value of the resin (a) is preferably in the range of 8 to 18, more preferably in the range of 9 to 16, even more preferably in the range of 9.5 to 14.

In a case where the resin particles (B) are to be used as a toner for electrophotography, electrostatic recording, or electrostatic printing, the Mn of the resin (a) is preferably in the range of 1,000 to 5,000,000, more preferably in the range of 2,000 to 500,000, even more preferably in the range of 3,000 to 100,000.

Further, in a case where the resin (a) has a melting point, the melting point of the resin (a) is preferably in the range of 20 to 200° C., more preferably in the range of 30 to 90° C., even more preferably in the range of 40 to 80° C.

Furthermore, the Tg of the resin (a) is preferably in the range of 20 to 200° C., more preferably in the range of 30 to 90° C., even more preferably in the range of 40 to 80° C.

Moreover, the SP value of the resin (a) is preferably in the range of 8 to 16, more preferably in the range of 8.5 to 16, even more preferably in the range of 9 to 14.

The resin particle (A) may contain an additive (T) (e.g., various additives such as a filler, a colorant, a plasticizer, a releasing agent, a charge control agent, a UV absorbing agent, an antioxidant, an anti-static agent, a fire retardant, an antibacterial agent, and a preservative) in addition to the resin (a).

The amount of the additive (T) contained in the resin particle (A) can be appropriately set according to the purpose of use thereof, but is preferably in the range of 0.01 to 200%, more preferably in the range of 0.1 to 150%, even more preferably in the range of 0.2 to 100% with respect to the weight of the resin particle (A).

Examples of a filler to be added include silica, alumina, titanium oxide, barium titanate, magnesium titanate, calcium titanate, strontium titanate, zinc oxide, tin oxide, silicas and, clay, talc, wollastonite, diatomite, chromium oxide, ceric oxide, chromic oxide, ceric oxide, colcothar, antimony trioxide, magnesium oxide, zirconium oxide, barium sulfate, barium carbonate, calcium carbonate, silicon carbide, and silicon nitride.

Examples of a colorant to be added include all the well-known dyes and pigments such as Carbon black, Nigrosine dyes, Iron black, Naphthol yellow S, Hansa yellow (10G, 5G and G), Cadmium yellow, Yellow colored iron oxide, Yellow ochre, Chrome yellow, Titanium yellow, Polyazo yellow, Oil yellow, Hansa yellow (GR, A, RN and R), Pigment yellow L, Benzidine yellow (G and GR), Permanent yellow (NCG), Vulcan fast yellow (5G and R), Tartrazine lake, Quinoline yellow lake, Anthracene yellow BGL, Isoindolinone yellow, Colcothar, Red lead, Orange lead, Cadmium red, Cadmium mercury red, Antimony orange, Permanent red 4R, Para red, Fire red, Parachloro-orthonitro aniline red, Lithol fast scarlet G, Brilliant fast scarlet, Brilliant carmine BS, Permanent red (F2R, F4R, FRL, FRLL and F4RH), Fast scarlet VD, Vulcan fast rubine B, Brilliant scarlet G, Lithol rubine GX, Permanent red F5R, Brilliant carmine 6B, Pigment scarlet 3B, Bordeaux 5B, Toluidine maroon, Permanent bordeaux F2K, Helio bordeaux BL, Bordeaux 10B, BON maroon light, BON maroon medium, Eosine lake, Rhodamine lake B, Rhodamine lake Y, Alizarin lake, Thioindigo red B, Thioindigo maroon, Oil red, Quinacridone red, Pyrazolone red, Polyazo red, Chrome vermilion, Benzidine orange, Perynone orange, Oil orange, Cobalt blue, Cerulean blue, Alkali blue lake, Peacock blue lake, Victoria blue lake, metal-free Phthalocyanine blue, Phthalocyanine blue, Fast sky blue, Indanthrene blue (RS, BC), Indigo, Ultramarine, Prussian blue, Anthraquinone blue, Fast violet B, Methyl violet lake, Cobalt violet, Manganese violet, Dioxane violet, Anthraquinone violet, Chrome green, Zinc green, Chromium oxide, Viridian, Emerald green, Pigment green B, Naphthol green B, Green gold, Acid green lake, Malachite green lake, Phthalocyanine green, Anthraquinone green, Titanium oxide, Hydrozincite, Lithopone, and mixtures of two or more of them.

Examples of a plasticizer (L) to be added include, but not limited to, the following (L1) to (L5) and mixtures of two or more of them:

(L1) phthalic acid esters having 8 to 60 carbon atoms (e.g., dibutyl phthalate, dioctyl phthalate, butyl benzyl phthalate, and diisodecyl phthalate);

(L2) aliphatic dibasic acid esters having 6 to 60 carbon atoms (e.g., di-2-ethylhexyl adipate and 2-ethylhexyl sebacate);

(L3) trimellitic acid esters having 10 to 70 carbon atoms (e.g., tri-2-ethylhexyl trimellitate and trioctyl trimellitate);

(L4) phosphoric acid esters having 6 to 60 carbon atoms (e.g., triethyl phosphate, tri-2-ethylhexyl phosphate, and tricresyl phosphate); and (L5) fatty acid esters having 8 to 50 carbon atoms (e.g., butyl oleate).

Among these plasticizers, (L1), (L2), (L3), and (L4) are preferably used, more preferably (L1), (L2), and (L4), even more preferably (L1) and (L4).

As a releasing agent, waxes and silicone oils having a kinematic viscosity of 30 to 100,000 cSt at 25° C., and the like can be used.

Examples of a wax to be added include well-known waxes such as polyolefin waxes (e.g., polyethylene wax and polypropylene wax), long-chain hydrocarbon waxes (e.g., paraffin wax and Sasol wax), and carbonyl group-containing waxes. Among these waxes, carbonyl group-containing waxes are preferably used. Examples of the carbonyl group-containing wax include polyalkanoic acid esters (e.g., carnauba wax, montan wax, trimethylolpropane tribehenate, pentaerythritol tetrabehenate, pentaerythritol diacetate dibehenate, glycerin tribehenate, and 1,18-octadecanediol distearate), polyalkanol esters (e.g., tristearyl trimellitate and distearyl maleate), polyalkanoic acid amides (e.g., ethylenediamine dibehenyl amide), polyalkylamides (e.g., tristearylamide trimellitate), and dialkyl ketones (e.g., distearyl ketone). Among these carbonyl group-containing waxes, polyalkanoic acid esters are preferably used.

Examples of a charge control agent to be added include all the well-known charge control agents such as nigrosine-based dyes, triphenylmethane-based dyes, chromium-containing metal complex dyes, molybdic acid chelate pigments, rhodamine-based dyes, alkoxy-based amines, quaternary ammonium salts (including fluorine-modified quaternary ammonium salts), alkylamides, phosphorus or phosphorus compounds, tungsten or tungsten compounds, fluorine-based activators, metal salts of salicylic acid, and metal salts of salicylic acid derivatives. Specific examples of the charge control agents include Bontron 03 as a nigrosine-based dye, Bontron P-51 as a quaternary ammonium salt, Bontron S-34 as a metal-containing azo dye, E-82 as an oxynaphthoic acid-based metal complex, E-84 as a salicylic acid-based metal complex, E-89 as a phenol-based condensation product, which are manufactured by Orient Chemical Industries, Ltd.; TP-302 and TP-415 as quaternary ammonium salt molybdenum complexes, which are manufactured by Hodogaya Chemical Co., Ltd.; Copy Charge PSY VP2038 as a quaternary ammonium salt, Copy blue PR as a triphenylmethane derivative, Copy Charge NEG VP2036 and Copy Charge NX VP434 as quaternary ammonium salts, which are manufactured by Hoechst; LRA-901 and LR-147 as a boron complex, which are manufactured by Japan Carlit Co., Ltd.; copper phthalocyanine, perylene, quinacridone, azo-based pigments, and other polymeric compounds having a functional group such as a sulfo group, a carboxyl group, or a quaternary ammonium salt group.

A method for adding the additive (T) to the resin particles (A) is not limited to any specific one. For example, in the preparing method of resin particles according to the present invention (which will be described later), the additive (T) may be added to an aqueous medium, or a mixture of the resin (a) and the additive (T) may be dispersed in an aqueous medium.

In this regard, it is to be noted that it is not always necessary to add the additive (T) in course of the formation of the resin particles (A), and the additive (T) may be added after the formation of the resin particles (A). For example, a colorant may be added in accordance with a well-known dyeing method after the formation of the resin particles (A) containing no colorant, or the resin particles (A) may be impregnated with the additive (T) together with a solvent (U) (which will be described later) and/or the plasticizer (L).

In a case where a colorant is added to the resin particles (A) as an additive, the colorant may be one treated with a coupling agent such as a silane coupling agent, a titanium coupling agent, an aluminum coupling agent, or the like.

Particularly, in a case where carbon black is used as a colorant, carbon black treated with an aluminum coupling agent is preferably used.

As a method for allowing the resin particles (A) to contain a colorant treated with a coupling agent, a method in which a dispersion liquid containing a colorant treated with an aluminum coupling agent is formed to mix it with the resin (a) can be mentioned, for example.

In the formation of a dispersion liquid containing a colorant, it is preferred that the colorant and an aluminum coupling agent are first mixed by a wet method. Mixing of a colorant and an aluminum coupling agent is carried out using an ordinary mixer or agitator. Specifically, a colorant and an aluminum coupling agent are placed in an appropriate container equipped with particulate media such as an Atliter, a ball mill, a sand mill, a vibration mill, or the like, and then they are agitated. Preferred examples of particulate media to be used include steel such as stainless steel and carbon steel, alumina, zirconia, and silica, and the like. In the process, a temperature within the container is kept at 20 to 160° C., preferably at 20 to 100° C., more preferably at 30 to 60° C. By using such an agitator, it is possible to release the colorant from agglomeration and to disperse the colorant so that the average particle size of the colorant becomes about 0.7 µm or less, preferably about 0.4 µm or less and, further, to apply load so that the aluminum coupling agent is made to react with and adsorbed to the colorant. Next, it is preferred that the colorant dispersion liquid is again dispersed by high speed shearing or the like in order to prevent agglomeration of the colorant in the mixing of the colorant dispersion liquid with the binder resin. Dispersion can be carried out by a dispersing machine having a high-speed blade rotation type or forced gap-passing type high-speed shearing system, such as various homomixers, homogenizers, colloid mills, Ultra-Turrax, Clear Mill, or the like.

The aluminum coupling agent to be used is not limited to any specific one as long as it is a compound capable of coupling with a colorant. Examples of such an aluminum coupling agent include alkyl (having 1 to 30 carbon atoms) acetoacetate aluminum isopropylate, aluminum tris(ethyl acetoacetate), and aluminum monoisopropoxy monooleoxy ethylacetoacetate.

The amount of the aluminum coupling agent to be used is preferably in the range of 0.1 to 100 parts with respect to 100 parts of the colorant from the viewpoint of dispersibility of the colorant in the resin (a). The upper limit is more preferably 50 parts, even more preferably 30 parts. The lower limit is more preferably 0.3 parts In this regard, it is to be noted that "parts" in this specification refers to parts by weight.

A method for preparing an aqueous dispersion (I) containing the resin particles (A) is not limited to any specific one, but examples of such a method include a method in which a precursor of the resin (a) is allowed to react in an aqueous medium, a method in which a dead polymer of the resin (a) is formed to disperse it in an aqueous medium, and a method in which a dead polymer of the resin (a) is dispersed in an aqueous medium, and a precursor of the resin (a) is allowed to react in the aqueous medium.

Examples of a method, in which a precursor of the resin (a) is allowed to react in an aqueous medium, include the following methods (1) and (2):

(1) in a case where vinyl resins are concerned, a method in which an aqueous dispersion of the resin particles (A) is prepared using a monomer as an initial material under the presence of polymerization catalyst by polymerization reaction such as suspension polymerization, emulsion polymerization, seed polymerization, or dispersion polymerization; and (2) in a case where polyaddition or condensation resins such as polyesters, polyurethanes, and epoxy resins are concerned, a method in which a precursor (a0) of the resin (a) or a solvent solution of the precursor (a0) is dispersed in an aqueous medium under the presence of a suitable dispersant, and is then cured by heating or adding a curing agent (which is a compound having at least 2 functional groups capable of reacting with the precursor in the molecule) to produce an aqueous dispersion of the resin particles (A).

Examples of a method, in which a dead polymer of the resin (a) is formed to disperse it in an aqueous medium, include the following methods (3) to (7):

(3) a method in which the resin (a) produced in advance by polymerization reaction (which may be carried out by any polymerization reaction method such as addition polymerization, ring-opening polymerization, polyaddition, addition condensation, condensation polymerization, or the like) is ground using a mechanical rotary or jet type pulverizer, and is then classified to obtain resin particles (A), and the resin particles (A) are dispersed in water under the presence of a suitable dispersant;

(4) a method in which a solution of the resin (a) which is produced in advance by polymerization reaction (which may be carried out by any polymerization reaction method such as addition polymerization, ring-opening polymerization, polyaddition, addition condensation, condensation polymerization, or the like) is sprayed in a mist form to obtain resin particles (A) from which the solvent is removed, and the resin particles (A) are dispersed in water under the presence of a suitable dispersant;

(5) a method in which the resin (a) is in advance produced by polymerization reaction (which may be carried out by any polymerization reaction method such as addition polymerization, ring-opening polymerization, polyaddition, addition condensation, condensation polymerization, or the like), resin particles are precipitated by adding a poor solvent (which is a solvent incapable of dissolving the resin (a) in 1% or more at 25° C.) to a solution of the resin (a) or by cooling a solution of the resin (a) produced in advance by dissolving the resin (a) in a solvent by heating, the solvent is removed to obtain resin particles (A), and the resin particles (A) are dispersed in water under the presence of a suitable dispersant;

(6) a method in which a solution of the resin (a) which is produced in advance by polymerization reaction (which may be carried out by any polymerization reaction method such as addition polymerization, ring-opening polymerization, polyaddition, addition condensation, condensation polymerization, or the like) is dispersed in an aqueous medium under the presence of a suitable dispersant, and then the solvent is removed by heating or decompression; and (7) a method in which in a solution of the resin (a) which is produced in advance by polymerization reaction (which may be carried out by any polymerization reaction method such as addition polymerization, ring-opening polymerization, polyaddition, addition condensation, condensation polymerization, or the like), a suitable emulsifier is dissolved, then water is added for phase inversion emulsification, and thereafter the solvent is removed by heating or decompression.

Examples of a method, in which a dead polymer of the resin (a) is dispersed in an aqueous medium and then a precursor of the resin (a) is allowed to react in the aqueous medium, include a method in which a precursor of the resin (a) is allowed to react by the method (2) in an aqueous medium, in which a dead polymer is dispersed, obtained by any one of the methods (3) to (7) (e.g., a combination of the methods (6) and (2)). According to such a method, by selecting appropriate production conditions as described in, for example, PCT publication No. WO 01/60893, it is possible to obtain an aqueous dispersion (I) of composite resin particles in which resin particles (A1) of a dead polymer are attached to the surface of resin particles (A2) obtained by allowing a precursor to react. This method is preferred because a resin dispersion having a uniform particle diameter can be obtained. In this regard, it is to be noted that a resin (a2) obtained by allowing a precursor to react and a dead polymer resin (a1) may be the same or different from each other.

The particle diameter of the resin particles (A1) is smaller than that of the resin particles (A2). From the viewpoint of particle size uniformity, the ratio between the volume average particle diameter of the resin particles (A1) (hereinafter, simply referred to as "DA1") and the volume average particle diameter of the resin particles (A2) (hereinafter, simply referred to as "DA2") (that is, DA1/DA2) preferably lies in the range of 0.0001 to 0.5. The upper limit is more preferably 0.4, even more preferably 0.3, the lower limit is more preferably 0.0005, even more preferably 0.001. By setting DA1/DA2 to a value within the above range, it is possible to allow the resin particles (A1) to adsorb to the surface of the resin particles (A2) efficiently. Further, it is also possible to make the particle size distribution of the composite resin particles sharp.

Further, from the viewpoint of achieving an appropriate SF-1 of the composite resin particles and improving particle size uniformity and the viewpoint of storage stability of the composite resin particles, the amount of the resin particles (A1) with respect to the total weight of the resin particles (A1) and the resin particles (A2) in the composite resin particles preferably lies in the range of 0.01 to 60%. The upper limit is more preferably 55%, even more preferably 50%, the lower limit is more preferably 0.05%, even more preferably 0.01%.

In these producing methods of the aqueous dispersion (I), the solid (which is a component other than a solvent) concentration of the aqueous dispersion preferably lies in the range of 1 to 70%, more preferably in the range of 5 to 65%, even more preferably in the range of 10 to 60%.

Among the above-described methods (1) to (7), the methods (1), (2), (6), and (7) and a combination of two or more of them are preferable, the methods (1), (2), and (6) and a combination of two or more of them are more preferable, and the methods (2) and (6) and a combination of them are even more preferable.

The method in which a precursor of the resin (a) is allowed to react in an aqueous medium will be described in more detail.

The precursor (a0) of the resin (a) is not limited to any specific one as long as it can be converted to the resin (a) by chemical reaction. For example, in a case where the resin (a) is a vinyl resin, examples of the precursor (a0) include the vinyl monomers mentioned above (which may be used singly or in combination of two or more of them) and solutions thereof.

In a case where the vinyl monomer is used as the precursor (a0), examples of the method for allowing the precursor (a0) to react to convert it to the resin (a) include a method in which an oil phase comprised of an oil-soluble initiator, the monomer and, as necessary, a solvent (U) (which will be described later) is dispersed and suspended in water under the presence of a synthetic polymeric dispersant (H) to carry out radical polymerization reaction by heating (that is, the so-called suspension polymerization method), and a method in which an oil phase comprised of the monomer and, as necessary, a solvent (U) is emulsified in water containing an emulsifier and a water-soluble initiator to carry out radical polymerization reaction by heating (that is, the so-called emulsion polymerization method).

As the oil-soluble initiator and the water-soluble initiator, peroxide polymerization initiators, and azo polymerization initiators, and the like can be used. A peroxide polymerization initiator may be used in combination with a reducing agent to form a redox polymerization initiator. Further, these initiators can be used in combination of two or more of them.

Examples of the peroxide polymerization initiators include oil-soluble peroxide polymerization initiators and water-soluble peroxide polymerization initiators. As oil-soluble peroxide polymerization initiators, acetylcyclohexylsulfonyl peroxide, isobutylyl peroxide, diisopropyl peroxydicarbonate, di-2-ethylhexyl peroxydicarbonate, 2,4-dichlorobenzoyl peroxide, t-butyl peroxypivalate, 3,5,5-trimethylhexanonyl peroxide, octanoyl peroxide, decanoyl peroxide, lauroyl peroxide, stearoly peroxide, propionitrile peroxide, succinic acid peroxide, acetyl peroxide, t-butyl peroxy-2-ethylhexanoate, benzoyl peroxide, p-chlorobenzoyl peroxide, t-butylperoxyisobutylate, t-butyl peroxymaleic acid, t-butyl peroxylaurate, cyclohexanone peroxide, t-butyl peroxyisopropylcarbonate, 2,5-dimethyl-2,5-dibenzoylperoxyhexane, t-butyl peroxyacetate, t-butyl peroxybenzoate, diisobutyl diperoxyphthalate, methyl ethyl ketone peroxide, dicumyl peroxide, 2,5-dimethyl-2,5-di-t-butylperoxyhexane, t-butylcumyl peroxide, t-butyl hydroperoxide, di-t-butyl peroxide, diisopropylbenzene hydroperoxide, p-menthane hydroperoxide, pinane hydroperoxide, 2,5-dimethylhexane-2,5-dihydroperoxide, cumene peroxide, and the like can be used. As water-soluble peroxide polymerization initiators, hydrogen peroxide, peracetic acid, ammonium persulfate, potassium persulfate, sodium persulfate, and the like can be used.

Examples of the azo polymerization initiators include oil-soluble azo polymerization initiators and water-soluble azo polymerization initiators. As oil-soluble azo polymerization initiators, 2,2'-azobisisobutyronitrile, 1,1'-azobiscyclohexane-1-carbonytrile, 2,2'-azobis-4-methoxy-2,4-dimethylvaleronitrile, 2,2'-azobis-2,4-dimethylvaleronitrile, dimethyl-2,2'-azobis(2-methylpropionate), 1,1'-azobis(1-acetoxy-1-phenylethane), 2,2'-azobis(4-methoxy-2,4-dimethylvaleronitrile), and the like can be used. As water-soluble azo polymerization initiators, azobisamidinopropane salt, azobiscyanovaleric acid (salt), 2,2'-azobis[2-methyl-N-(2-hydroxyethyl)propionamide], and the like can be used.

As redox polymerization initiators, oil-soluble redox polymerization initiators and water-soluble redox polymerization initiators can be mentioned.

Examples of the oil-soluble redox polymerization initiators include combinations of oil-soluble peroxides such as hydroperoxides (e.g., tert-butyl hydroxyperoxide and cumene hydroxyperoxide), dialkyl peroxides (e.g., lauroyl peroxide), diacyl peroxides (e.g., benzoyl peroxide), and the like and oil-soluble reducing agents such as tertiary amines (e.g., triethylamine and tributylamine), naphthenic acid salts, mercaptans (e.g., mercaptoethanol and lauryl mercaptan), organic metal compounds (e.g., triethylaluminum, triethylboron, and diethylzinc), and the like.

Examples of the water-soluble redox polymerization initiators include combinations of water-soluble peroxides such as persulfate salts (e.g., potassium persulfate and ammonium persulfate), hydrogen peroxide, hydroperoxides (e.g., tert-butyl hydroxyperoxide and cumene hydroxyperoxide), and the like and water-soluble inorganic or organic reducing agents such as iron (II) salts, sodium bisulfite, alcohols, and dimethylaniline).

In a case where the resin (a) is a condensed resin (e.g., polyurethane, an epoxy resin, or polyester), a combination of a reactive group-containing prepolymer (α) (which will be described later) and a curing agent (β) may also be used as the precursor (a0) Here, the word "reactive group" means a group capable of reacting with the curing agent (β).

In this case, examples of a method of allowing the precursor (a0) to react to form the resin particles (A) include the following methods (1) to (3):

(1) a method in which an oil phase containing the reactive group-containing prepolymer (α), the curing agent (β) and, as necessary, the solvent (U) is dispersed in an aqueous medium, and then the reactive group-containing prepolymer (α) and the curing agent (β) are allowed to react by heating to form the resin particles (A) comprising the resin (a);

(2) a method in which the reactive group-containing prepolymer (α) or a solution thereof is dispersed in an aqueous medium, and a water-soluble curing agent (β) is added thereto to allow them to react so as to form the resin particles (A) comprising the resin (a); and (3) a method in which the reactive group-containing prepolymer (α) or a solution thereof is dispersed in an aqueous medium to allow the reactive group-containing prepolymer (α) to react with water to form the resin particles (A) comprising the resin (a), the method being applicable to a case where the reactive group-containing prepolymer (α) can be cured by the reaction with water.

Examples of a combination of the reactive group contained in the reactive group-containing prepolymer (α) and the curing agent (β) include the following combinations (1) and (2):

(1) a combination of a reactive group-containing prepolymer (α1) having a functional group capable of reacting with an active hydrogen-containing group and an active hydrogen-containing compound (β1) which may be blocked with a removal compound; and (2) a combination of a reactive group-containing prepolymer (α2) having an active hydrogen-containing group, and a curing agent (β2) having a functional group capable of reacting with an active hydrogen-containing group.

Among these combinations, the combination (1) is preferably used from the viewpoint of reaction rate in water.

Examples of a functional group capable of reacting with an active hydrogen-containing group include an isocyanate group, a blocked isosyanate group, an epoxy group, an acid anhydride group, and an acid halide (e.g., acid chlorides and acid bromides) group.

Among them, an isocyanate group, a blocked isocyanate group, and an epoxy group are preferably used, more preferably an isocyanate group and a blocked isocyanate group.

In this regard, it is to be noted that the blocked isocyanate group means an isocyanate group that is blocked with a blocking agent.

Examples of the blocking agent include well-known blocking agents such as oximes (e.g., acetoxime, methyl isobutyl ketoxime, diethyl ketoxime, cyclopentanone oxime, cyclohexanone oxime and methyl ethyl ketoxime), lactams (e.g., γ-butyrolactam, ε-caprolactam, and γ-valerolactam), aliphatic alcohols having 1 to 20 carbon atoms (e.g., ethanol, methanol, and octanol), phenols (e.g., phenol, m-cresol, xylenol, and nonylphenol), active methylene compounds (e.g., acetylacetone, ethyl malonate, and ethyl acetoacetate), basic nitrogen-containing compounds (e.g., N,N-diethylhydroxylamine, 2-hydroxypiridine, pyridine N-oxide, and 2-mercaptopyridine), and mixtures of two or more of them.

Among these blocking agents, oximes are preferably used, more preferably methyl ethyl ketoxime.

As the skeleton of the reactive group-containing prepolymer (α), polyethers, polyesters, epoxy resins, or polyurethanes can be used.

Among them, polyesters, epoxy resins, and polyurethanes are preferably used, more preferably polyesters and polyurethanes.

Examples of polyethers include polyethylene oxide, polypropylene oxide, polybutylene oxide, and polytetramethylene oxide.

Examples of polyesters include polycondensation products of the diols (11) and the dicarboxylic acids (13), and polylactones (e.g., the ring-opening polymerization product of ε-caprolactone).

Examples of epoxy resins include addition-condensation products of bisphenols (e.g., bisphenol A, bisphenol F, and bisphenol S) and epichlorohydrine.

Examples of polyurethanes include polyaddition products of the diols (11) and the polyisocyanates (15), and polysddition products of the polyesters and the polyisocyanates (15).

A method of introducing the above mentioned reactive group into the polyester, the epoxy resin, or the polyurethane is not limited to any specific one, but examples of such a method include the following methods (1) and (2):

(1) a method in which one of components constituting the polyester, the epoxy resin, or the polyurethane is used excessively to allow a reactive group of the component to remain; and (2) a method in which one of components constituting the polyester, the epoxy resin, or the polyurethane is used excessively to allow a functional group of the component to remain, and then the functional group is further reacted with a compound having a functional group (reactive group) capable of reacting with the remaining functional group.

According to the method (1), it is possible to obtain a hydroxyl group-containing polyester prepolymer, a carboxyl group-containing polyester prepolymer, an acid halide group-containing polyester prepolymer, a hydroxyl group-containing epoxy resin prepolymer, an epoxy group-containing epoxy resin prepolymer, a hydroxyl group-containing polyurethane prepolymer, and an isocyanate group-containing polyurethane prepolymer, and the like.

For example, in the case of a hydroxyl group-containing polyester prepolymer, the ratio between the components in the method (1), that is, the ratio between the alcohol components (e.g., the diols (11) and the polyols (12)) and the carboxylic acid components (e.g., the dicarboxylic acids (13) and the polycarboxylic acids (14)) as expressed in terms of the equivalent ratio of hydroxyl group [OH] to carboxyl group [COOH], that is, the equivalent ratio [OH]/[COOH] is preferably in the range of 2/1 to 1/1, more preferably in the range of 1.5/1 to 1/1, even more preferably in the range of 1.3/1 to 1.02/1.

In each of the cases of a carboxyl group-containing polyester prepolymer, an acid halide group-containing polyester prepolymer, a hydroxyl group-containing polyurethane prepolymer, and an isocyanate group-containing polyurethane prepolymer, components thereof are different from those of the example case, but a preferred ratio between the components is the same as described above.

According to the method (2), an isocyanate group-containing prepolymer can be obtained by allowing a prepolymer obtained by the method (1) to react with polyisocyanate, a blocked isocyanate group-containing prepolymer can be obtained by allowing a prepolymer obtained by the method (1) to react with blocked polyisocyanate, an epoxy group-containing prepolymer can be obtained by allowing a prepolymer obtained by the method (1) to react with polyepoxide, and an acid anhydride group-containing prepolymer can be obtained by allowing a prepolymer obtained by the method (1) to react with a compound having 2 or more acid anhydride groups.

For example, in the case of obtaining an isocyanate group-containing polyester prepolymer by allowing a hydroxyl group-containing polyester to react with polyisocyanate according to the method (2), the amount of the compound having are active group to be used, that is, the ratio between the hydroxyl group-containing polyester and polyisocyanate to be used as expressed in terms of the equivalent ratio of isocyanate group [NCO]/hydroxyl group [OH], that is, the equivalent ratio [NCO]/[OH] is preferably in the range of 5/1 to 1/1, more preferably in the range of 4/1 to 1.2/1, even more oreferably in the range of 2.5/1 to 1.5/1.

In each of the cases of other prepolymers, components thereof are different from those of the example case, but a preferred ratio between the components is the same as described above.

The average number of the reactive group per molecule contained in the reactive group-containing prepolymer (α) is preferably in the range of 1 to 3, more preferably in the range of 1.5 to 3, even more preferably in the range of 1.8 to 2.5. By setting the average number of the reactive group per molecule contained in the reactive group-containing prepolymer (α) to a value within the above range, it is possible for the resin (a) obtained by the reaction with the curing agent (β) to have high mechanical strength.

The Mn of the reactive group-containing prepolymer (α) is preferably in the range of 500 to 30,000. The upper limit is more preferably 20,000, even more 10,000, the lower limit is more preferably 1,000, even more 2,000.

The Mw of the reactive group-containing prepolymer (α) is preferably in the range of 1,000 to 50,000. The upper limit is more preferably 40,000, even more preferably 20,000, the lower limit is more preferably 2,000, even more preferably 4,000.

As the active hydrogen group-containing compounds (β1), polyamines which may be blocked with removable compounds and polyols which may be blocked with removable compounds can be mentioned, in addition to the above mentioned water, the diols (11), the polyols (12) having 3 to 6 or more hydroxyl groups, the dicarboxylic acids (13), the polycarboxylic acids (14) having 3 to 4 or more carboxyl groups, the polyamines (16), and the polythiols (17).

Examples of a polyamine blocked with a removable compound include ketimine compounds obtained by dehydration between the polyamines (16) and ketones having 3 to 8 carbon atoms (e.g., acetone, methyl ethyl ketone, and methyl isobutyl ketone), aldimine compounds obtained by dehydration between the polyamines (16) and aldehyde compounds having 2 to 8 carbon atome (e.g., formaldehyde and acetaldehyde), enamine compounds obtainable from the polyamines (16) and ketones having 3 to 8 carbon atoms or aldehydes having 2 to 8 carbon atoms, and oxazolidine compounds.

Among these active hydrogen group-containing compounds (β1), polyamines which may be blocked, polyols which may be blocked, and water are preferably used, more preferably polyamines which may be blocked and water, even more preferably polyamines, ketimine compounds and water, most preferably 4,4'-diaminodiphenylmethane, xylylenediamine, isophoronediamine, ethylenediamine, diethylenetriamine, triethylenetetramine, ketimine compounds obtainable from these polyamines and ketones, and water.

When the resin particles (A) are produced, a reaction terminator (βs) may be used as necessary together with the active hydrogen group-containing compound (β1). By using the reaction terminator (βs) and the active hydrogen group-containing compound (β1) together in a certain ratio, it becomes easy to control the molecular weight of the resin (a) comprising the resin particles (A).

Examples of such a reaction terminator (βs) include monoamines having 1 to 40 carbon atoms (e.g., diethylamine, dibutylamine, butylamine, laurylamine, monoethanolamine, and diethanolamine), blocked monoamines having 3 to 40 carbon atoms (e.g., ketimine compounds), monools having 1 to 40 carbon atoms (e.g., methanol, ethanol, isopropanol, butanol, and phenol), monomercaptans having 2 to 40 carbon atoms (e.g., butylmercaptan and laurylmercaptan), monoisocyanates having 5 to 40 carbon atoms (e.g., butyl isocyanate, lauryl isocyanate, and phenyl isocyanate), and monoepoxides having 2 to 40 carbon atoms (e.g., butyl glycidyl ether).

In the combination (2) described above (that is, in the combination of the reactive group-containing prepolymer (α2) having an active hydrogen-containing group and the curing agent (β2) having a functional group capable of reacting with an active hydrogen-containing group), examples of the active hydrogen-containing group contained in the reactive group-containing prepolymer (α) include an amino group, hydroxyl groups (an alcoholic hydroxyl group and a phenolic hydroxyl group), a mercapto group, a carboxyl group, and organic groups obtained by blocking these groups with removable compounds (e.g., ketones and aldehydes) (e.g., a ketimine-containing group, an aldimine-containing group, an oxazolidine-containing group, an enamine-containg group, an acetal-contianing group, a ketal-containing group, a thioacetal-contianing group, and a thioketal-containing group).

Among these active hydrogen-containing groups, an amino group, hydroxyl groups, and organic groups obtained by blocking these groups with removable compounds are preferably used, more preferably hydroxyl groups.

Examples of the curing agent (β2) having a functional group capable of reacting with an active hydrogen-containg group include the polyisocyanates (15), the polyepoxides (18), the dicarboxylic acids (13), the polycarboxylic acids (14), compounds having two or more acid anhydride groups, and compounds having two or more acid halide groups.

Among these curing agents (β2), the polyisocyanates and the polyepoxides are preferably used, more preferably the polyisocyanates.

Examples of the compound having two or more acid anhydride groups include a (co)polymer of pyromellitic anhydride and polymaleic anhydride, and the like.

Examples of the compound having two or more acid halide groups include acid halides (e.g., acid chloride, acid bromide, and acid iodide) of the dicarboxylic acids (13) or the polycarboxylic acids (14).

When the resin particles (A) are produced, the reaction terminator (βs) may be used as necessary together with the curing agent (β2) having a functional group capable of reacting with an active hydrogen-containing group. By using the reaction terminator (βs) and the curing agent (β2) together in a certain ratio, it becomes easy to control the molecular weight of the resin (a) constituting the resin particles (A).

The amount of the curing agent (β) to be used as expressed in terms of the ratio [α]/[β] of the equivalent of the reactive group [α]in the reactive group-containing prepolymer (α) to the equivalent of the active hydrogen-containing group [β]in the curing agent (β) is preferably in the range of 1/2 to 2/1, more preferably in the range of 1.5/1 to 1/1.5, even more preferably in the range of 1.2/1 to 1/1.2.

In a case where water is used as the curing agent (β), water is considered as a bifunctional active hydrogen-containing compound.

The length of time of reaction between the reactive group-containing prepolymer (α) and the curing agent (β) is selected according to reactivity that depends on the combination of the kind of reactive group contained in the prepolymer (α) and the curing agent (β), but is preferably in the range of 10 minutes to 40 hours, more preferably in the range of 30 minutes to 24 hours, even more preferably in the range of 30 minutes to 8 hours.

Further, the temperature of the reaction is preferably in the range of 0 to 150° C., more preferably in the range of 50 to 120° C.

As necessary, a well-known catalyst can be used. Specifically, in the case of the reaction between isocyanate and an active hydrogen-containing compound by way of example, dibutyltin laurate, dioctyltin laurate or the like can be used.

As the emulsifier and the dispersant used in the above-mentioned methods (1) to (7) for obtaining the aqueous dispersant (I), well-known surfactants (S) and synthetic polymeric dispersants (H), and the like can be mentioned.

In a case where the surfactant (S) is used, the amount thereof to be used is preferably in the range of 0.0001 to 50%, more preferably in the range of 0.0.005 to 0.4%, even more preferably in the range of 0.001 to 0.3% with respect to the weight of the resin (a) and the precursor thereof (a0).

In a case where the synthetic polymeric dispersant (H) is used, the amount thereof to be used is preferably in the range of 0.005 to 0.6%, more preferably in the range of 0.01 to 0.4%, even more preferably in the range of 0.02 to 0.3% with respect to the weight of the resin (a) and the precursor thereof (a0).

Further, the plasticizer (L) or the like may be used as an emulsifier assistant or a dispersant assistant.

In a case where the plasticizer (L) is used, the amount thereof to be used is preferably in the range of 0.01 to 0.3%, more preferably in the range of 0.02 to 0.25%, even more preferably in the range of 0.03 to 0.2% with respect to the weight of the resin (a) and the precursor thereof (a0).

The plasticizer (L) may be added as necessary to either water or the resin (a) at dispersion-emulsification.

As surfactants (S), anionic surfactants (S-1), cationic surfactants (S-2), amphoteric surfactants (S-3), and nonionic surfactants (S-4), and the like can be used. In this regard, it is to be noted that these surfactants (S) can be used in combination of two or more of them.

Examples of the anionic surfactant (S-1) include carboxylic acids or salts thereof, sulfuric acid ester salts, salts of carboxymethylation products, sulfonic acid salts, and phosphoric acid ester salts.

As carboxylic acids or salts thereof, saturated or unsaturated fatty acids having 8 to 22 carbon atoms or salts thereof can be used, and examples of such carboxylic acids include capric acid, lauric acid, myristic acid, palmitic acid, stearic acid, arachidic acid, behenic acid, oleic acid, linoleic acid, ricinoleic acid, and mixtures of higher fatty acids obtained by saponifying coconut oil, palm kernel oil, rice bran oil, beef tallow, and the like.

As the salts of these carboxylic acids, sodium salts, potassium salts, amine salts, ammonium salts, quaternary ammonium salts, and alkanolamine salts (e.g., monoethanolamine salt, diethanolamine salt, and triethanolamine salt), and the like can be mentioned.

As sulfuric acid ester salts, higher alcohol sulfuric acid ester salts ($C_8$–$C_{18}$ aliphatic alcohol sulfuric acid ester salts), higher alkyl ether sulfuric acid ester salts ($C_8$–$C_{18}$ aliphatic alcohol-E or PO (1 to 10 mol) adduct sulfuric acid ester salts), sulfated oils (which are obtained by directly sulfating and neutralizing naturally-occurring unsaturated fats and oils having 12 to 50 carbon atoms or unsaturated waxes), sulfated fatty acid esters (which are obtained by sulfating and neutralizing lower alcohol (having 1 to 8 carbon atoms) esters of unsaturated fatty acids (having 6 to 40 carbon atoms)), and sulfated olefins (which are obtained by sulfating and neutralizing olefins having 12 to 18 carbon atoms), and the like can be used.

As the salts, sodium salts, potassium salts, amine salts, ammonium salts, quaternary ammonium salts, alkanolamine salts (e.g., monoethanolamine salt, diethanolamine salt, and triethanolamine salt), and the like can be mentioned.

Examples of the higher alcohol sulfuric acid ester salts include salts of octyl alcohol sulfate, salts of decyl alcohol sulfate, salts of lauryl alcohol sulfate, salts of stearyl alcohol sulfate, sulfuric acid ester salts of alcohols synthesized using a Ziegler catalyst (e.g., "ALFOL 1214" which is a product of CONDEA), and sulfuric acid ester salts of alcohols synthesized by oxo process (e.g., "Dobanol 23, 25, 45" and "Diadol 115-L, 115-H, 135" which are products of Mitsubishi Chemical Corporation, "Tridecanol" which is a product of Kyowa Hakko Kogyo Co., Ltd., and "Oxocol 1213, 1215, 1415" which are products of Nissan Chemical Industries, Ltd.).

Examples of the higher alkyl ether sulfuric acid ester salts include lauryl alcohol-EO (2 mol) adduct sulfuric acid ester salts, and octyl alcohol-EO (3 mol) adduct sulfuric acid ester salts.

Examples of the sulfated oil include salts of sulfation products of castor oil, arachis oil, olive oil, rape oil, beef tallow, mutton tallow, and the like.

Examples of the sulfated fatty acid ester include salts of sulfation products of butyl oleate, butyl ricinoleate, and the like.

An example of the sulfated olefins includes Teepol (which is a product of Shell Co.).

As salts of carboxymethylation products, salts of carboxymethylation products of aliphatic alcohols having 8 to 16 carbon atoms, salts of carboxymethylation products of $C_8$–$C_{16}$ aliphatic alcohol-EO or PO (1 to 10 mol) adducts, and the like can be used.

Examples of the salts of carboxymethylation products of aliphatic alcohols include a sodium salt of carboxymethylated octyl alcohol, a sodium salt of carboxymethylated decyl alcohol, a sodium salt of carboxymethylated lauryl alcohol, a sodium salt of carboxymethylated Dobanol 23, and a sodium salt of carboxymethylated tridecanol.

Examples of the salts of carboxymethylation products of aliphatic alcohol-EO (1 to 10 mol) adducts include a sodium salt of carboxymethylation product of octyl alcohol-EO (3 mol) adduct, a sodium salt of carboxymethylation product of lauryl alcohol-EO (4 mol) adduct, a sodium salt of carboxymethylation product of Dobanol 23-EO (3 mol) adduct, and a sodium salt of carboxymethylation product of tridecanol-EO (5 mol) adduct.

As sulfonic acid salts, alkylbenzene sulfonates, alkylnaphthalene sulfonates, sulfosuccinic acid diester salts, α-olefin sulfonates, Igepon T type, other sulfonates of aromatic ring-containing compounds, and the like can be used.

An example of the alkylbenzene sulfonates includes sodium dodecylbenzensulfonate.

An example of the alkylnaphthalene sulfonates includes sodium dodecylnaphthalenesulfonate.

An example of the sulfosuccinic acid diester salts includes sodium di-2-ethylhexyl sulfosuccinate.

Examples of the sulfonates of aromatic ring-containing compounds include alkylated diphenyl ether mono- or disulfonate and styrenated phenol sulfonate.

As phosphoric acid ester salts, higher alcohol phosphoric acid ester salts, higher alcohol-EO adduct phosphoric acid ester salts, and the like can be used.

Examples of the higher alcohol phosphoric acid ester salts include lauryl alcohol phosphoric acid monoester disodium salt, and lauryl alcohol phosphoric acid diester sodium salt.

An example of the higher alcohol-EO adduct phosphoric acid ester salts includes oleyl alcohol-EO (5 mol) adduct phosphoric acid monoester disodium salt.

As cationic surfactants (S-2), quaternary ammonium salt-type surfactants, amine salt-type surfactants, and the like can be used.

The quaternary ammonium salt-type surfactants can be obtained by the reaction between tertiary amines having 3 to 40 carbon atoms and quaternizing agents (e.g., alkylating agents such as methyl chloride, methyl bromide, ethyl chloride, benzyl chloride, and dimethyl sulfate, and EO), and examples of such quaternary ammonium salt-type surfactants include lauryltrimethylammonium chloride, didecyldimethylammonium chloride, dioctyldimethylammonium bromide, stearyltrimethylammonium bromide, lauryldimethylbenzylammonium chloride (benzalkonium chloride), cetylpyridinium chloride, polyoxyethylenetrimethylammonium chloride, and stearamidoethyldiethylmethylammonium methosulfate.

The amine salt-type surfactants can be obtained by neutralizing primary to tertiary amines with inorganic acid (e.g., hydrochloric acid, nitric acid, sulfuric acid, hydrogen iodide, phosphoric acid, or perchloric acid) or organic acid (e.g., acetic acid, formic acid, oxalic acid, lactic acid, gluconic acid, adipic acid, alkylphosphoric acid having 2 to 24 carbon atoms, malic acid, or citric acid).

Examples of primary amine salt-type surfactants include inorganic or organic acid salts of aliphatic higher amines having 8 to 40 carbon atoms (e.g., higher amines such as laurylamine, stearylamine, cetylamine, hydrogenated beef tallow amine, and rosin amine), and $C_8$–$C_{40}$ higher fatty acid (e.g., stearic acid and oleic acid) salts of lower amines having 2 to 6 carbon atoms.

Examples of secondary amine salt-type surfactants include inorganic or organic acid salts of aliphatic amine (having 4 to 40 carbon atoms)-EO adducts.

Examples of tertiary amine salt-type surfactants include inorganic or organic acid salts of aliphatic amines having 4 to 40 carbon atoms (e.g., triethylamine, ethyldimethylamine, and N,N,N',N'-tetramethylethylenediamine), aliphatic amines (having 2 to 40 carbon atoms)-EO (2 or more mol) adducts, alicyclic amines having 6 to 40 carbon atoms (e.g., N-methylpyrrolidine, N-methylpiperidine, N-methylhexamethyleneimine, N-methylmorpholine, and 1,8-diazabicyclo (5,4,0)-7-undecene), nitrogen-containing heterocyclic aromatic amines having 5 to 30 carbon atoms (e.g., 4-dimetylaminopyridine, N-methylimidazole, and 4,4'-dipyridyl), and inorganic or organic acid salts of tertiary amines such as triethanolamine monostearate, stearamidoethyldiethylmethylethanolamine, and the like.

As amphoteric surfactants (S-3), carboxylic acid salt-type amphoteric surfactants, sulfuric acid ester salt-type amphoteric surfactants, sulfonic acid salt-type amphoteric surfactants, phosphoric acid ester salt-type amphoteric surfactants, and the like can be used.

As the carboxylic acid salt-type amphoteric surfactants, amino acid-based amphoteric surfactants, betaine-type amphoteric surfactants, and imidazoline-type amphoteric surfactants, and the like can be used. The amino acid-type amphoteric surfactant is an amphoteric surfactant having an amino group and a carboxyl group in the molecule, and examples of such amino acid-type amphoteric surfactant include compounds represented by the general formula (2):

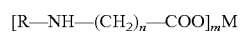

$$[\text{R—NH—}(CH_2)_n\text{—COO}]_m M \qquad (2)$$

wherein R represents a monovalent hydrocarbon group, n is 1 or 2, m is 1 or 2, and M represents a hydrogen ion, an alkali metal ion, an alkaline-earth metal ion, an ammonium cation, an amine cation, an alkanolamine cation, or the like.

Examples of the amphoteric surfactants represented by the general formula (2) include alkyl (having 6 to 40 carbon atoms) aminopropionic acid-type amphoteric surfactants (e.g., sodium stearylaminopropionate and sodium laurylaminopropionate) and alkyl (having 4 to 24 carbon atoms) aminoacetic acid-type amphoteric surfactants (e.g., sodium laurylaminoacetate).

The betaine-type amphoteric surfactant is an amphoteric surfactant having a quaternary ammonium salt-type cationic moiety and a carboxylic acid-type anionic moiety in the molecule, and examples of such a betaine-type amphoteric surfactant include alkyl (having 6 to 40 carbon atoms) dimethylbetaines (e.g., stearyldimethylaminoacetic acid betaine and lauryldimethylaminoacetic acid betaine), amido betaines having 6 to 40 carbon atoms (e.g., coco-fatty acid amidopropyl betaine), and alkyl (having 6 to 40 carbon atoms) dihydroxyalkyl (having 6 to 40 carbon atoms) betaines (e.g., lauryldihydroxyethyl betaine).

The imidazoline-type amphoteric surfactant is an amphoteric surfactant having a cationic moiety containing an imidazoline ring and a carboxylic acid-type anionic moiety, and an example of such an imidazoline-type amphoteric surfactant includes 2-undecyl-N-carboxymethyl-N-hydroxyethylimidazolinium betaine.

As other amphoteric surfactants, glycine-type amphoteric surfactants such as sodium lauroyl glycine, sodium lauryl diaminoethylglycine, lauryldiaminoethylglycine hydrochloride, and dioctyldiaminoethylglycine hydrochloride, sulfobetaine-based amphoteric surfactants such as pentadecylsulfotaurine, sulfonic acid salt-type amphoteric surfactants, and phosphoric acid ester salt-type amphoteric surfactants, and the like can be used.

As nonionic surfactants (S-4), AO adduct-type nonionic surfactants and polyhydric alcohol-type nonionic surfactants, and the like can be used.

The AO adduct-type nonionic surfactants can be obtained by directly adding AO (having 2 to 20 carbon atoms) to higher alcohols having 8 to 40 carbon atoms, higher fatty acids having 8 to 40 carbon atoms or alkylamines having 8 to 40 carbon atoms, or by reacting higher fatty acids with polyalkylene glycols obtained by adding AO to glycol, or by adding AO to esterification products obtained by the reaction of polyhydric alcohols and higher fatty acids, or by adding AO to higher fatty acid amides.

Examples of AO include EO, PO, and BO.

Among them, EO, and a random or block adduct of EO and PO are preferably used.

The number of mols of the AO to be added is preferably in the range of 10 to 50 mols, and 50 to 100% of the added AO is preferably EO.

Examples of the AO adduct-type nonionic surfactants include oxyalkylene($C_2$–$C_{24}$) alkyl($C_8$–$C_{40}$) ethers (e.g., octyl alcohol-EO (20 mol) adduct, lauryl alcohol-EO (20 mol) adduct, stearyl alcohol-EO (10 mol) adduct, oleyl alcohol-EO (5 mol) adduct, and lauryl alcohol-EO (10 mol)/PO (20 mol) block adduct), polyoxyalkylene($C_2$–$C_{24}$) higher fatty acid($C_8$–$C_{40}$) esters (e.g., stearic acid-EO (10 mol) adduct and lauric acid-EO (10 mol) adduct), higher fatty acid($C_8$–$C_{40}$) esters of polyoxyalkylene($C_2$–$C_{24}$) polyhydric alcohols($C_3$–$C_{40}$), (e.g., polyethylene glycol (Degree of polymerization of 20) lauric acid diester, polyethylene glycol (Degree of polymerization of 20) oleic acid diester, and polyethylene glycol (Degree of polymerization of 20) stearic acid diester), polyoxyalkylene($C_2$–$C_{24}$) alykyl ($C_8$–$C_{40}$)phenyl ethers (e.g., nonylphenol-EO (4 mol) adduct, nonylphenol-EO (8 mol)/PO (20 mol) block adduct, octylphenol-EO (10 mol) adduct, bisphenol A-EO (10 mol) adduct, dinonylphenol-EO (20 mol) adduct, and styrenated phenol-EO (20 mol) adduct), polyoxyalkylene($C_2$–$C_{24}$) alkyl($C_8$–$C_{40}$)amino ethers (e.g., laurylamine-EO (10 mol) adduct and stearylamine-EO (20 mol) adduct), and polyoxyalkylene($C_2$–$C_{24}$) alkanolamides (in which amide (acyl moiety) has 8 to 24 carbon atoms) (e.g., hydroxyethyl laurylamide-EO (10 mol) adduct, hydroxypropyloleylamide-EO (20 mol) adduct, and dihydroxyethyl laurylamide-EO (10 mol) adduct).

As polyhydric alcohol-type nonionic surfactants, polyhydric alcohol fatty acid esters, polyhydric alcohol fatty acid ester-AO adducts, polyhydric alcohol alkyl ethers, polyhydric alcohol alkyl ether-AO adducts, and the like can be used. Here, polyhydric alcohols have 3 to 24 carbon atoms, fatty acids have 8 to 40 carbon atoms, and AO has 2 to 24 carbon atoms.

Examples of the polyhydric alcohol fatty acid esters include pentaerythritol monolaurate, pentaerythritol monooleate, sorbitan monolaurate, sorbitan monostearate, sorbitan monolaurate, sorbitan dilaurate, sorbitan dioleate, and sucrose monostearate.

Examples of the polyhydric alcohol fatty acid ester-AO adducts include ethylene glycol monooleate-EO (10 mol) adduct, ethylene glycol monostearate-EO (20 mol) adduct, trimethylolpropane monostearate-EO (20 mol)/PO (10 mol) random adduct, sorbitan monolaurate-EO (10 mol) adduct, sorbitan monostearate-EO (20 mol) adduct, sorbiatn distearate-EO (20 mol) adduct, and sorbitan dilaurate-EO (12 mol)/PO (24 mol) random adduct.

Examples of the polyhydric alcohol alkyl ethers include pentaerythritol monobutyl ether, pentaerythritol monolauryl ether, sorbitan monomethyl ether, sorbitan monostearyl ether, methyl glycoside, and lauryl glycoside.

Examples of the polyhydric alcohol alkyl ether-AO adducts include sorbitan monostearyl ether-EO (10 mol) adduct, methyl glycoside-EO (20 mol)/PO (10 mol) random adduct, lauryl glycoside-EO (10 mol) adduct, and stearyl glycoside-EO (20 mol)/PO (20 mol) random adduct.

Examples of the synthetic polymeric dispersants (H) include polyvinyl alcohol, polyvinyl pyrrolidone, polyethylene glycol, polyethylene imine, and water-soluble polyurethanes (e.g., reaction products of polyethylene glycol or polycaprolactone diol with polyisocyanates).

Examples of the solvents (U) used in the methods (1) to (7) to obtain the aqueous dispersant (I) include aromatic hydrocarbon solvents (e.g., toluene, xylene, ethylbenzene, and tetralin), aliphatic or alicyclic hydrocarbon solvents (e.g., n-hexane, n-heptane, mineral spirit, and cyclohexane), halogen-containing solvents (e.g., methyl chloride, methyl bromide, methyl iodide, methylene dichloride, carbon tetrachloride, trichloroethylene, and perchloroethylene), ester or ester ether solvents (e.g., ethyl acetate, butyl acetate, methoxybutyl acetate, methylcellosolve acetate, and ethylcellosolve acetate), ether solvents (e.g., diethyl ether, tetrahydrofuran, dioxane, ethylcellosolve, butylcellosolve, and propylene glycol monomethyl ether), ketone solvents (e.g., acetone, methyl ethyl ketone, methyl isobutyl ketone, di-n-butyl ketone, and cyclohexanone), alcohol solvents (e.g., methanol, ethanol, n-propanol, isopropanol, n-butanol, isobutanol, t-butanol, 2-ethylhexyl alcohol, and benzyl alcohol), amide solvents (e.g., dimethylformamide and dimethylacetamide), sulfoxide solvents (e.g., dimethylsulfoxide), heterocyclic compound solvents (e.g., N-methylpyrrolidone), and mixtures of two or more of them.

Among these solvents, from the viewpoint of easiness of removing solvents, aromatic hydrocarbon solvents, halogen-containing solvents, ester or ester ether solvents, ketone solvents, and alcohol solvents are preferably used, more preferably ester or ester ether solvents, ketone solvents and alcohol solvents.

The plasticizer (L) to be used is not limited to any specific one, and the above-mentioned plasticizers (L1) to (L5) and mixtures of two or more of them can be used. A preferred range of the amount of the plasticizer to be used is the same as described above.

The amount of an aqueous medium to be used with respect to 100 parts of the resin (a) is preferably in the range of 50 to 2,000 parts, more preferably in the range of 100 to 1,000 parts, even more preferably in the range of 100 to 500 parts. If the amount of an aqueous medium to be used is less than above lower limit, dispersibility of the resin (a) tends to be lowered. On the other hand, if the amount of an aqueous medium to be used exceeds the above upper limit, economic problems tend to arise.

It should be noted that the aqueous medium is not limited to any specific one as long as it is a liquid containing water as an essential component. Examples of such an aqueous medium include water, aqueous solutions of solvents, aqueous solutions of the surfactants (S), aqueous solutions of the synthetic polymeric dispersants (H), and mixtures of two or more of them.

Examples of the solvents include, among the solvents (U) mentioned above, ester or ester ether solvents, ether solvents, ketone solvents, alcohol solvents, amide solvents, sulfoxide solvents, heterocyclic compound solvents, and mixtures of two or more of them.

In a case where the aqueous medium contains such a solvent, the amount of the solvent contained in the aqueous medium is preferably in the range of 1 to 80%, more preferably in the range of 2 to 70%, even more preferably in the range of 5 to 30% with respect to the weight of the aqueous medium.

In a case where the surfactant (S) is used, the amount of the surfactant (S) contained in the aqueous medium is preferably in the range of 0.001 to 0.3%, more preferably in the range of 0.005 to 0.2%, even more preferably in the range of 0.01 to 0.15% with respect to the weight of the aqueous medium.

In a case where the synthetic polymeric dispersant (H) is used, the amount of the synthetic polymeric dispersant (H) contained in the aqueous medium is preferably in the range of 0.0001 to 0.2%, more preferably in the range of 0.0002 to 0.15%, even more preferably in the range of 0.0005 to 0.1% with respect to the weight of the aqueous medium.

When the resin (a) and/or the precursor (a0) is dispersed in the aqueous medium, the resin (a) and the precursor (a0) are preferably in the form of liquid or solution. In a case where the resin (a) and the precursor (a0) are solid at room temperatures, the resin (a) and the precursor (a0) may be dispersed at a temperature of the melting point thereof or higher so that they can be dispersed in liquid form, or a solution obtained by dissolving the resin (a) and the precursor (a0) in the above-mentioned solvent (U) may be used.

In a case where the solvent (U) is used, a preferred solvent depends on the kind of resin (a) and precursor (a0) to be used, but the difference in SP value between the resin (a) and the precursor (a0) is preferably 3 or less.

The viscosities of the resin (a), the precursor (a0), and solvent solutions thereof are preferably in the range of 10 to 50,000 mPa·s, more preferably in the range of 100 to 30,000 mPa·s, even more preferably in the range of 200 to 20,000 mPa·s, from the viewpoint of particle size uniformity.

In this regard, it is to be noted that all viscosities in this specification were measured using a rotor-type viscometer such as a BL-type viscometer, a BM-type viscometer, or a BH-type viscometer (which are manufactured by Tokyo Instruments Co., Ltd.) at a temperature of 25° C.

A temperature at the time of dispersion is preferably in the range of 0 to 150° C., more preferably in the range of 5 to 98° C., even more preferably in the range of 10 to 60° C. In this regard, it is to be noted that a temperature exceeding 100° C. refers to a temperature under pressure.

In a case where the solvent is used, the concentration of the resin is determined so that the viscosity of the solution thereof becomes a value within the above-mentioned preferred range, and is preferably in the range of 5 to 95%, more preferably in the range of 10 to 90%, even more preferably in the range of 20 to 80%.

The method for preparing resin particles according to the present invention comprises a step of applying a shear force to an aqueous dispersion (II) with increased viscosity formed by adding a thickener (V) to the dispersant (I) containing the resin particles (A) obtained in such a manner as described above, and a subsequent step of decreasing the viscosity of the aqueous dispersant.

As such a thickener (V), water-soluble naturally-occurring polymers (e.g., polysaccharide-based naturally-occurring polymers and animal-based naturally-occurring polymers), water-soluble semisynthetic polymers (e.g., cellulose-based semisynthetic polymers, starch-based semisynthetic polymers, and alginic acid-based semisynthetic polymers), water-soluble synthetic polymers (e.g., acrylic acid-based (co)polymer salts, vinyl ether-based (co)polymers, and acrylamide-based (co)polymers), and the like can be used.

Examples of the water-soluble naturally-occurring polymers include, but not limited to, polysaccharide-based naturally-occurring polymers (e.g., pullulan, guar gum, locast bean gum, gum Arabic, and starch), and animal-based naturally-occurring polymers (e.g., gelatin and casein).

Examples of the water-soluble semisynthetic polymers include, but not limited to, cellulose-based semisynthetic polymers (e.g., methyl cellulose, ethyl cellulose, hydroxyethyl cellulose, ethylhydroxyethyl cellulose, methylhydroxypropyl cellulose, carboxymethyl cellulose, and sodium carboxymethyl cellulose), starch-based semisynthetic polymers (e.g., soluble starch, carboxymethyl starch, methyl starch, and cationized starch), and alginic acid-based semisynthetic polymers (e.g., alginic acid salts, chitin, and chitosan).

The water-soluble synthetic polymeric thickeners can be obtained by a well-known polymerization method using a well-known catalyst.

Examples of the acrylic acid-based (co)polymers include a polymer of acrylic acid and copolymers of acrylic acid and other monomers. As such other monomers, the above-mentioned vinyl monomers (1) to (10) can be used. The amount of acrylic acid contained in the copolymer is generally 60% or more.

Examples of the acrylic acid-based (co)polymer salts include alkali metal salts (e.g., sodium salts and potassium salts), ammonium salts, amine salts, and quaternary ammonium salts. Amine salts to be used are not limited to any specific ones as long as they are amine compounds, and examples of such amine salts include primary amine salts (e.g., ethylamine salts, butylamine salts, and octylamine salts), secondary amine salts (e.g., diethylamine salts and dibutylamine salts), and tertiary amine salts (e.g., triethylamine salts and tributylamine salts). Examples of quaternary amine salts include tetraethylammonium salts, lauryltriethylammonium salts, tetrabutylammonium salts, and lauryltributylammonium salts.

Examples of the vinyl ether-based (co)polymers include (co) polymers of vinyl alkyl ethers having 3 to 6 carbon atoms (e.g., vinyl methyl ether, vinyl ethyl ether, vinyl propyl ether and vinyl butyl ether), vinyl alcohol-EO adducts, urethane-modified vinyl ether obtained by joining vinyl alcohol to polyethylene glycol by the use of polyisocyanate (15), and mixtures of two or more of them.

Examples of the acrylamide-based (co)polymers include (co)polymers of acrylamide, N-alkyl($C_1$–$C_4$)acrylamides (e.g., N-methylacrylamide, N-ethylacrylamide, N-propylacrylamide, N-isopropylacrylamide, and N-butylacrylamide), N,N-dialkyl($C_1$–$C_4$)acrylamides (e.g., N,N-dimethylacrylamide, N,N-diethylacrylamide, N,N-dipropylacrylamide, N,N-diisopropylacrylamide, and N,N-butylacrylamide), and mixtures of two or more of them, and salts of copolymers of acrylamide, N-alkyl($C_1$–$C_4$)acrylamide, N,N-dialkyl($C_1$–$C_4$ alkyl) acrylamide and mixtures of two or more of them with acrylic acid.

In a case where acrylic acid is used in forming a copolymer, the amount of acrylic acid contained in the copolymer is generally less than 40%.

As salts of copolymers formed using acrylic acid, the same salts of acrylic acid-based (co)polymers as mentioned above can be mentioned.

The Mw of the water-soluble synthetic polymeric thickener is preferably in the range of 1,000 to 10,000,000, more preferably in the range of 2,000 to 1,000,000.

Among these thickeners (V) mentioned above, cellulose-based semisynthetic polymers, acrylic acid-based (co)polymer salts, and vinyl ether-based (co)copolymers are preferably used, more preferably sodium salts of acrylic acid-based polymers, hydroxyethyl cellulose, and carboxymethyl cellulose, even more preferably carboxymethyl cellulose.

The amount of the thickener (V) to be added depends on the kind thereof to be used, but is preferably in the range of 0.0001 to 10%, more preferably in the range of 0.001 to 5%, even more preferably in the range of 0.01 to 2% with respect to the weight of the aqueous dispersion (I).

The viscosity of the aqueous dispersion (II) with increased viscosity (at 25° C.) is preferably in the range of 300 to 100,000 mPa·s. The lower limit is more preferably 1,000 mPa·s, even more preferably 2,000 mPa·s. The upper limit is more preferably 60,000 mPa·s, even more preferably 20,000 mPa·s By setting the viscosity of the aqueous dispersion (II) to a value within the above range, it is possible to reduce the time for deforming resin particles by the application of a shear force. In addition, it is also possible to obtain a dispersion in which the deformed resin particles are hard to return to spherical resin particles, that is, it is possible to obtain a dispersion in which deformed resin particles are stable in their shape.

A method for deforming the resin particles (A) by the application of a shear force to the aqueous dispersion (II) is not particularly limited, and a well-known method can be used.

An apparatus to be used in applying a shear force is not limited to any specific one as long as it is commercially available as an agitator or a dispersing machine. Examples of trade names of such commercially available dispersing machines include batch-type dispersing machines such as Homogenizer (manufactured by IKA), Polytron (manufactured by KINEMATICA), and TK Auto Homomixer (manufactured by Tokushu Kika Kogyo Co., Ltd.), continuous-type dispersing machines such as Ebara Milder (manufactured by Ebara Corporation), TK Filmics and TK Pipeline Homomixer (which are manufactured by Tokushu Kika Kogyo Co., Ltd.), Colloid Mill (manufactured by Shinko Pantec Co., Ltd.), Slusher and Trigonal Wet Mill (which are manufactured by Mitsui Miike Kakoki K.K.), Cavitron (manufactured by EUROTEC Ltd.), and Fine Flow Mill (manufactured by Pacific Machinery & Engineering Co., Ltd.), high-pressure dispersing machines such as Microfluidizer (manufactured by Mizuho Industrial Co., Ltd.), Nanomizer (manufactured by Nanomizer Inc.), and APV Gaulin (manufactured by Gaulin Inc.), membrane dispersing machines such as Membrane Dispersing Machine (manufactured by REICA Co., Ltd.), vibration-type dispersing machines such as Vibromixer (manufactured by REICA CO., Ltd.), and ultrasonic dispersing machines such as Ultrasonic Homogenizer (manufactured by BRANSON).

Among these dispersing machines, from the viewpoint of application of a uniform shear force, APV Gaulin, Homogenizer, TK Auto Homomixer, Ebara Milder, TK Filmics, and TK Pipeline Homomixer are preferably used, more preferably TK Auto Homomixer, Ebara Milder, TK Filmics, and TK Pipeline Homomixer, even more preferably TK Auto Homomixer, TK Filmics, and TK Pipeline Homomixer.

A temperature at the time of applying a shear force is not limited to any specific value, but is preferably in the range of 0 to 60° C., more preferably in the range of 5 to 50° C., even more preferably in the range of 10 to 40° C., from the viewpoint of easiness of deformation of resin particles and prevention of coagulation of resin particles.

The length of time for the application of a shearing force depends on the kind of apparatus to be used, and is not particularly limited. However, from the viewpoint of easiness of deformation of resin particles and productivity, the length of time for the application of a shear force is preferably in the range of 0.01 second to 6 hours, more preferably in the range of 0.01 second to 1 hour, even more preferably in the range of 0.01 second to 50 minutes, most preferably in the range of 0.1 second to 20 minutes.

A shear force to be applied varies depending on the viscosity of the aqueous dispersion (II), the length of time for the application of a shear force, and the temperature at the time of application of a shear force, and can be appropriately determined. However, from the viewpoint of easiness of deformation of resin particles and easiness of particle diameter control, a shear force is preferably applied at 10 to 50,000 rpm by, for example, the above-mentioned apparatus for applying a shearing force. The lower limit thereof is more preferably at 100 rpm, even more preferably at 500 rpm. The upper limit thereof is more preferably at 20,000 rpm, even more preferably at 10,000 rpm.

As a method for decreasing the viscosity of the aqueous dispersion after the application of a shear force, the following methods (1) to (3) and a combination of two or more of them can be employed:

(1) a method in which the viscosity of the aqueous dispersion is reduced by controlling the pH thereof;

(2) a method in which a viscosity reducing agent (E) is added to reduce the viscosity of the aqueous dispersion; and (3) a method in which the viscosity of the aqueous dispersion is reduced by controlling the temperature thereof.

In the method (1), a preferred pH of the aqueous dispersion can be appropriately selected according to the kind of thickener used and a target viscosity, but the pH of the aqueous dispersion is preferably in the range of 1 to 9, more preferably in the range of 1 to 6, even more preferably in the range of 2 to 4. It is preferred that the pH is adjusted by adding inorganic acid such as hydrohalic acid (e.g., hydrofluoric acid, hydrochloric acid, or hydrobromic acid), sulfuric acid, nitric acid, phosphoric acid, or perchloric acid, or organic acid such as acetic acid, oxalic acid, or carbonic acid, in the form of aqueous solution (e.g., 2 to 40%) as necessary. Among them, inorganic acids (aqueous solutions) are more preferably used, even more preferably an aqueous hydrochloric acid solution and an aqueous phosphoric acid solution. The method (1) is suitably used in a case where the water-soluble synthetic polymer is used as the thickener (V).

The viscosity reducing agent (E) to be used in the method (2) depends on the kind of thickener used and a target viscosity, and examples of the viscosity reducing agent include enzymes, inorganic acid salts, and organic acid salts.

An enzyme is suitably used in a case where the water-soluble naturally-occurring polymer and/or the water-soluble semisynthetic polymer is used as the thickener (V). Examples of such an enzyme include α-glycanase (e.g., amylase, dextranase, or pullulanase) and β-glycanase (e.g., cellulase, β-1,3-glucanase, or chitinase). These enzymes can be used in combination of two or more of them.

Examples of inorganic acid salts and organic acid salts include, but not limited to, alkali metals salts (e.g., sodium salts and potassium salts) and alkaline-earth metal salts (e.g., magnesium salts and calcium salts) of the inorganic acids and the organic acids mentioned above.

From the viewpoint of productivity (e.g., time for decreasing viscosity) and manufacturing costs, the amount of the enzyme to be added is preferably in the range of 0.000001 to 1%, more preferably in the range of 0.000005 to 0.1%, even more preferably in the range of 0.00001 to 0.01% with respect to the weight of the aqueous dispersion (II).

The amount of the inorganic or organic acid salt to be added is not limited to any specific value, but, from the viewpoint of a viscosity reduction effect and manufacturing costs, is preferably in the range of 0.0001 to 15%, more preferably in the range of 0.001 to 10%, even more preferably in the range of 0.01 to 5% with respect to the weight of the aqueous dispersion.

The method (3) is particularly effective in a case where the viscosity increasing effect of the thickener used has a dependence on temperature. For example, in a case where the acrylamide-based (co)polymer is used as the thickener, the viscosity of the aqueous dispersion can be reduced by decreasing the temperature thereof.

Among these methods (1) to (3), the method (1) and (2) are preferably employed. More preferably, the method (2) using an enzyme as a viscosity decreasing agent is employed because the viscosity of the aqueous dispersion can be quickly decreased.

A decreased viscosity (at 25°) of the aqueous dispersion is preferably 200 mPa·s or less. The upper limit is more preferably 100 mPa·s, even more preferably 60 mPa·s, the lower limit is more preferably 10 mPa·s. By setting the decreased viscosity of the aqueous dispersion to a value within the above range, it becomes easy to handle the aqueous dispersion until resin particles (B) are obtained. In addition, it becomes easy to wash the aqueous dispersion in a washing process (which will be described later) carried out as necessary.

A temperature at the time of carrying out the viscosity decreasing step is not limited to any specific value, but is preferably in the range of 5 to 40° C., more preferably in the range of 10 to 35° C., even more preferably in the range of 20 to 30° C., from the viewpoint of productivity and a viscosity reduction effect.

The length of time of the viscosity decreasing step is not limited to any specific value, but is preferably 3 hours or less, more preferably 1.5 hours or less, even more preferably in the range of 0.5 to 20 minutes, from the viewpoint of productivity.

In a case where a solvent has been used at the time of producing the aqueous dispersion (I), the solvent is removed by, for example, heating, decompression, washing with water, or a combination of two or more of them.

In a case where the thickener (V) and the surfactant (S) used adversely affect the physical properties of the resin particles (B) in use, these additives are preferably removed.

An example of a method for removing such additives includes a method, in which the aqueous dispersion is subjected to solid-liquid separation by a centrifuge, a sparkler filter and/or a filter press to obtain resin particles, water is added to the resin particles to again carry out solid-liquid separation with such a means mentioned above, and the latter process is repeatedly carried out.

The aqueous dispersion of the resin particles (B) obtained in such a manner as described above is subjected to solid-liquid separation (as necessary, solid-liquid separation is repeatedly carried out by adding water or the like), and then the obtained resin particles are dried to remove the aqueous medium, thereby enabling the resin particles (B) of the present invention to be obtained.

As a method for removing the aqueous medium, the following methods (1) to (3) and a combination of two or more of them can be employed:

(1) a method in which the aqueous dispersion is dried under reduced pressure or normal atmospheric pressure;

(2) a method in which solid-liquid separation is carried out with a centrifuge, a sparkler filter and/or a filter press, and the resulting solid is dried; and (3) a method in which the aqueous dispersion is freeze-dried (the so-called lyophilization).

In the methods (1) and (2), drying can be carried out by well-known machines such as a fluidized-bed type dryer, a vacuum dryer, and an air-circulation dryer.

As necessary, the obtained resin particles may be classified with an air classifier or a screen to attain a predetermined particle size distribution.

The ellipticity of the resin particles (B) obtained by the preparing method according to the present invention is expressed in terms of a shape factor (hereinafter, simply referred to as "SF-1"). The SF-1 of the resin particles (B) is preferably in the range of 110 to 800. The upper limit is more preferably 500, still more preferably 400, even more preferably 300, still even more preferably 250, most preferably 200. The lower limit is more preferably 120, still more preferably 130, most preferably 140. By setting the SF-1 to a value within the above range, it is possible to obtain the following effects according to the purposes of use of the resin particles.

Specifically, in a case where the resin particles are used as an additive for paint or an additive for coating materials, such resin particles show significant thixotropy when dispersed in a solvent or an aqueous medium, and therefore the resin particles are particularly useful as a fluidity improving agent for paint and coating materials. Further, since the resin particles are aligned uniformly in the direction of a longer diameter thereof in the formation of a coating, the effect of preventing blister from occurring in forming a coating and the effect of improving luster or a gloss of a coating can be obtained.

In this regard, it is to be noted that, in a case where the resin particles are to be used as an additive for paint or an additive for coating materials, the SF-1 of the resin particles is preferably in the range of 110 to 800. The upper limit is more preferably 500, even more preferably 300, the lower limit is most preferably 120, even more preferably 130, most preferably 140.

Further, in a case where the resin particles are used as an additive for cosmetics (e.g., lipstick and foundation), the resin particles facilitate smooth feeling when such cosmetics are applied to the skin. In a case where the resin particles are used as a resin for slush molding or a hot-melt adhesive, powder fluidity and powder release properties at the time of application are improved.

In this regard, it is to be noted that, in a case where the resin particles are to be used as an additive for cosmetics (e.g., lipstick and foundation), a resin for slush molding, or a hot-melt adhesive, the SF-1 of the resin particles is preferably in the range of 110 to 500. The upper limit is more preferably 300, even more preferably 200, the lower limit is more preferably 120, even more preferably 130, most preferably 140.

Furthermore, in a case where the resin particles are used as a toner for electrophotography, electrostatic recording or electrostatic printing, cleaning of the toner with a cleaning blade is facilitated.

In this regard, it is to be noted that, in a case where the resin particles are to be used as a toner for electrophotography, electrostatic recording, or electrostatic printing, the SF-1 of the resin particles is preferably in the range of 110 to 400. The upper limit is more preferably 300, even more preferably 250, the lower limit is more preferably 120, even more preferably 130, most preferably 140.

In the present invention, the shape factor (SF-1) is determined by random sampling 100 images of the resin particles obtained by scaling up 500 times by the use of an electronic microscope (e.g., "FE-SEM (S-800)" which is manufactured by Hitachi, Ltd; the same applies to the following description), inputting the image data into an image analyzer (e.g., "nexus NEW CUBE ver.2.5" manufactured by NEXUS Co., Ltd. and "Luzex III" manufactured by NIRECO Corporation; the same applies to the following description) via an interface to analyze the image data, and carrying out calculation using the formula (1):

$$(SF\text{-}1)=100\pi L^2/4S \quad (1)$$

wherein L represents the absolute longest length of the resin particle and S represents the projected area of the resin particle.

The volume average particle diameter (hereinafter, simply referred to as "DV") of the resin particles (B) obtained by the preparing method according to the present invention is preferably in the range of 0.1 to 300 μm, more preferably in the range of 0.5 to 250 μm, even more preferably in the range of 1 to 200 μm. By setting the DV to a value within the above range, the SF-1 of the resin particles (B) can lie within the preferred range described above.

In this regard, it is to be noted that the volume average particle diameter can be measured by a laser type particle size analyzer (e.g., "LA-920" which is a product of HORIBA, Ltd. or "Multisizer III" which is a product of Beckman Coulter).

In a case where it is necessary to improve the powder fluidity of the resin particles (B), the BET specific surface area of the resin particles (B) is preferably in the range of 0.5 to 8 m$^2$/g, more preferably in the range of 0.7 to 5 m$^2$/g.

In this regard, it is to be noted that the BET specific surface area can be measured with a specific surface area meter (e.g., "QUANTASORB" which is a product of Yuasa Ionics Inc.) (Measuring gas: He/Kr=99.9/0.1 vol %, Calibration gas: nitrogen).

Similarly, from the viewpoint of powder fluidity, the average of surface roughness (Ra) of the resin particles (B) is preferably in the range of 0.01 to 0.8 μm, more preferably in the range of 0.1 to 0.7 μm.

In this regard, it is to be noted that the (Ra) is the arithmetical mean value of the absolute values of the deviation between the roughness curve and the centerline thereof, and can be measured by a scanning probe microscope system (manufactured by, for example, Toyo Corporation).

The resin particles (B) according to the present invention can be suitably used as additives for paint, additives for coating materials, powder coatings, additives for cosmetics, resins for slush molding, spacers for use in manufacturing electronic components or devices such as liquid crystal displays, standard particles for electronic measuring instruments, toners for electrophotography, electrostatic recording, and electrostatic printing, hot-melt adhesives, and other molding materials.

EXAMPLES

The present invention will be further described with reference to the following examples, but the present invention is not limited to these examples.

Production Example 1

In a reaction vessel equipped with a stirring rod and a thermometer, 787 parts of polycaprolactonediol (Mn 2,000) and 800 parts of polyether diol (Mn 4,000, EO content 50 wt %, PO content 50 wt %) were placed, and were then subjected to dehydration under reduced pressure at 120° C. The water content after dehydration was 0.05%. After cooling to 60° C., 55.5 parts of HDI, 65.5 parts of hydrogenated MDI and 0.6 part of dibutyltin dilaurate were added, and then a reaction was carried out for 5 hours at 80° C., to thereby obtain a synthetic polymeric dispersant (1).

Further, 1 part of the synthetic polymeric dispersant (1) was mixed with 200 parts of water with stirring to obtain a milk white dispersant (1).

Production Example 2

In a reaction vessel equipped with a stirring rod and a thermometer, 2,000 parts of polycaprolactonediol having a hydroxyl value of 56 ("PLACCEL L220 AL" manufactured by Daicel Chemical Industries, Ltd.) was placed, and was then subjected to dehydration for 1 hour under heating to 110° C. at a reduced pressure of 3 mmHg. Then, 457 parts of IPDI was added, and a reaction was carried out for 10 hours at 110° C., to thereby obtain an isocyanate-terminated urethane prepolymer (1). The NCO content of the urethane prepolymer (1) was 3.6%.

Production Example 3

In a reaction vessel equipped with a stirring rod and a thermometer, 50 parts of ethylenediamine and 50 parts of methyl isobutyl ketone were placed, and then a reaction was carried out for 5 hours at 50° C., to thereby obtain a ketimine compound [curing agent (1)].

Production Example 4

In a reaction vessel equipped with a stirring rod and a thermometer, 100 parts of ethyl acetate and 50 parts of adipic acid, and 55 parts of ethylene glycol were placed. Then, 0.05 part of tributyl titanate was further added, and a reaction was carried out for 7 hours at 170° C., to thereby obtain a polyester solution (1).

Production Example 5

In a reaction vessel equipped with a stirring rod and a thermometer, 683 parts of water, 11 parts of methacrylic acid-EO adduct sulfuric acid ester sodium salt ("ELEMINOL RS-30" manufactured by Sanyo Chemical Industries, Ltd.), 83 parts of styrene, 83 parts of methacrylic acid, 110 parts of butylacrylate, 1 part of ammonium persulfate were placed, and were then stirred for 15 minutes at 400 rpm, to thereby obtain a white emulsion.

The emulsion was heated to 75° C. and was reacted for 5 hours. Further, 30 parts of a 1% aqueous ammonium persulfate solution was added, and then the resulting mixture was matured for 5 hours at 75° C., to thereby obtain an aqueous dispersion of vinyl resin (copolymer of styrene-methacrylic acid-butyl acrylate-methacrylic acid-EO adduct sulfuric acid ester sodium salt) [microparticle dispersion (1)].

The volume average particle diameter of the microparticle dispersion (1) as measured with LA-920 was 0.10 μm. A part of the microparticle dispersion (1) was dried to isolate a resin fraction. The Tg of the resin fraction was 57° C.

Production Example 6

990 parts of water, 83 parts of the microparticle dispersion (1), 52 parts of a 48.5% aqueous sodium dodecyl diphenyl ether disulfonate solution ("ELEMINOL MON-7" manufactured by Sanyo Chemical Industries, Ltd.), and 90 parts of ethyl acetate were mixed with stirring to obtain a milk white liquid. The obtained liquid was defined as a water phase (1).

Production Example 7

In a reaction vessel equipped with a condenser, a stirrer, and a nitrogen inlet pipe, 220 parts of bisphenol A-EO (2 mol) adduct, 561 parts of bisphenol A-PO (3 mol) adduct, 218 parts of terephthalic acid, 48 parts of adipic acid and 2 parts of dibutyltin oxide were placed, and then a reaction was carried out for 8 hours at normal atmospheric pressure at 230° C., and was further carried out for 5 hours at a reduced pressure of 10 to 15 mmHg. Then, 45 parts of trimellitic anhydride was added to the reaction vessel, and a reaction was carried out for 2 hours at a normal atmospheric pressure at 180° C., to obtain polyester (1). The obtained polyester (1) had an Mn of 2,500, an Mw of 6,700, a Tg of 43° C., and an acid value of 25.

Production Example 8

In a reaction vessel equipped with a condenser, a stirrer, and a nitrogen inlet pipe, 682 parts of bisphenol A-EO (2 mol) adduct, 81 parts of bisphenol A-PO (2 mol) adduct, 283 parts of terephthalic acid, 22 parts of trimellitic anhydride, and 2 parts of dibutyltin oxide were placed, and then a reaction was carried out for 8 hours at a normal atmospheric pressure at 230° C., and was further carried out for 5 hours at a reduced pressure of 10 to 15 mmHg, to obtain an intermediate polyester (1). The intermediate polyester (1) had an Mn of 2,100, an Mw of 9,500, a Tg of 55° C., an acid value of 0.5, and a hydroxyl value of 49.

Next, in a reaction vessel equipped with a condenser, a stirrer, and a nitrogen inlet pipe, 411 parts of the intermediate polyester (1), 89 parts of isophorone diisocyanate, and 500 parts of ethyl acetate were placed, and then a reaction was carried out for 5 hours at 100° C., to thereby obtain an isocyanate-terminated urethane prepolymer (2). The amount of the free isocyanate contained in the urethane prepolymer (2) was 1.53 wt %.

Production Example 9

In a reaction vessel equipped with a stirring rod and a thermometer, 170 parts of isophoronediamine and 75 parts of methyl ethyl ketone were placed, and then a reaction was carried out for 5 hours at 50° C., to thereby obtain a ketimine compound 2 [curing agent (2)].

Example 1

In a beaker, 140 parts of the urethane prepolymer (1) obtained in Production Example 2, 5 parts of the curing agent (1) obtained in Production Example 3, 50 parts of ethyl acetate were mixed, and then 465 parts of water and 3 parts of dodecylnaphthalenesulfonic acid sodium salt were added. Thereafter, they were mixed with a TK Homomixer (manufactured by Tokushu Kika Kogyo Co., Ltd.) for 1 minute at 12,000 rpm at 25° C., to thereby obtain an aqueous dispersion (X1-1).

To 100 parts of the aqueous dispersion (X1-1), 1.5 parts of sodium polyacrylate copolymer ("Carbopol" manufactured by BF Goodrich Co.), and the resulting mixture was stirred with a TK Homomixer for 8 minutes at 2,500 rpm at 25° C., to thereby obtain a dispersion (X1-2). The viscosity of the (X1-2) was 5,300 mPa·s. Further, 0.1 part of a 10% aqueous hydrochloric acid solution was added, and then the resulting mixture was stirred for 5 minutes at 25° C., to thereby obtain an (X1-3). The pH and the viscosity of the (X1-3) were 3.5 and 60 mPa·s, respectively.

100 parts of (X1-3) was centrifuged. After addition of 60 parts of water, solid-liquid separation was carried out by centrifugation, and this process was repeated twice. After drying for 1 hour at 35° C., resin particles (Y-1) were obtained. The physical properties of the resin particles (Y-1) are shown in Table 1.

Example 2

To 100 parts of the aqueous dispersion (X1-1) obtained in Example 1, 4 parts of polyvinyl ether copolymer ("SN thickener 621N" manufactured by San Nopco Limited) was added, and then they were stirred with a TK Homomixer at 2,500 rpm for 8 minutes at 25° C., to thereby obtain a dispersion (X2-2). The viscosity of the (X2-2) was 4,000 mPa·s. Further, 0.15 part of a 30% aqueous phosphoric acid solution was added, and the resulting mixture was stirred for 5 minutes at 25° C. to obtain an (X2-3). The pH and viscosity of the (X2-3) were 4.0 and 55 mPa·s, respectively.

100 parts of the (X2-3) was centrifuged. After addition of 60 parts of water, solid-liquid separation was carried out by centrifugation, and this process was repeated twice. After drying for 1 hour at 35° C., resin particles (Y-2) were obtained. The physical properties of the (Y-2) are shown in Table 1.

Example 3

In a reaction vessel equipped with a stirring rod and a thermometer, 48 parts of styrenated phenol-EO adduct ("EL-EMINOL HB-12" manufactured by Sanyo Chemical Industries Ltd.) and 241 parts of bisphenol A diglycidyl ether ("Epikote 828" manufactures by Yuka Shell) were placed, and then they were homogeneously dissolved.

Next, water was dropped into the reaction vessel under stirring. At the time when the amount of water dropped had reached to 31 parts, the content of the reaction vessel was emulsified so that the color thereof became milk white. 236 parts of water was further added, to obtain a dispersion.

After the obtained dispersion was heated to 73° C., a mixed solution of 20 parts of ethylenediamine and 446 parts of water was dropped into the dispersion over 2 hours, with the internal temperature of the reaction vessel being maintained at 73° C.

After the completion of dropping, a reaction was carried out for 4 hours at 73° C., and then a reaction product was matured for 4 hours at 90° C., to thereby obtain an aqueous dispersion (X3-1).

To 100 parts of the (X3-1), 3 parts of carboxymethyl cellulose ("CELLOGEN HH" manufactured by Daiichi Kogyo Seiyaku Co., Ltd.) was added, and then they were stirred with a Homogenizer (manufactured by IKA) at 1,000 rpm for 10 minutes at 25° C. to obtain a dispersion (X3-2). The viscosity of the dispersion (X3-2) was 3,300 mPa·s. Further, 0.02 part of amylase was added, and the resulting mixture was stirred for 3 minutes at 25° C. to obtain a dispersion (X3-3). The viscosity of the dispersion (X3-3) was 50 mPa·s.

103 parts of the (X3-3) was centrifuged. After addition of 50 parts of water, solid-liquid separation was carried out by centrifugation, and this process was repeated twice. After drying for 1 hour at 35° C., resin particles (Y-3) were obtained. The physical properties of the (Y-3) are shown in Table 1.

Example 4

In a beaker, 140 parts of the urethane prepolymer (1) and 5 parts of the curing agent (1) were mixed, and then 265 parts of the dispersion (1) obtained in Production Example 1 was added thereto. Then, they were mixed with an Ultra-disperzer (manufactured by Yamato Scientific Co., Ltd.) at 9,000 rpm for 1 minute at 25° C., to obtain an aqueous dispersion (X4-1).

To 100 parts of the (X4-1), 1 part of carboxymethyl cellulose ("CELLOGEN F-3H" manufactured by Daiichi Kogyo Seiyaku Co., Ltd.), and then they were stirred for 10 minutes at 25° C., to obtain a dispersion (X4-2). The viscosity of the (X4-2) was 5,600 mPa·s. The (X4-2) was stirred with a TK Homomixer (manufactured by Tokushu Kika Kogyo Co., Ltd.) at 3,000 rpm for 10 minutes at 25° C.

Further, 0.01 part of cellulase ("Cellulase AP3" manufactured by Amano Enzyme Inc.) was added, and the resulting mixture was stirred for 5 minutes at 25° C., to obtain a dispersion (X4-3). The viscosity of the (X4-3) was 20 mPa·s.

100 parts of the (X4-3) was centrifuged. After addition of 40 parts of water, solid-liquid separation was carried out by centrifugation, and this process was repeated twice. After drying for 1 hour at 35° C., resin particles (Y-4) were obtained. The physical properties of the (Y-4) are shown in Table 1.

Example 5

To 100 parts of the aqueous dispersion (X1-1) obtained in Example 1, 2 parts of carboxymethyl cellulose ("CELLOGEN HH" manufactured by Daiichi Kogyo Seiyaku Co., Ltd.) was added, and then they were stirred with a TK Homomixer at 2,500 rpm for 8 minutes at 25° C., to thereby obtain a dispersion (X5-2). The viscosity of the (X5-2) was 4,900 mPa·s. Further, 0.05 part of cellulase ("Celluclast" manufactured by Novozymes Japan Ltd.) was added, and the resulting mixture was stirred for 5 minutes at 25° C., to obtain (X5-3). The viscosity of the (X5-3) was 40 mPa·s.

100 parts of the (X5-3) was centrifuged. After addition of 60 parts of water, solid-liquid separation was carried out by centrifugation, and this process was repeated twice. After drying for 1 hour at 35° C., resin particles (Y-5) were obtained. The physical properties of the (Y-5) are shown in Table 1.

Example 6

In a beaker, 200 parts of the polyester solution (1) obtained in Production Example 4 was placed, and then 400 parts of water and 5 parts of dodecylnaphthalenesulfonic acid sodium salt were added thereto. Then, they were mixed with a TK Homomixer (manufactured by Tokushu Kika Kogyo Co., Ltd.) at 7,000 rpm for 1 minute at 25° C., to thereby obtain an aqueous dispersion (X6-1).

To 100 parts of the (X6-1), 3 parts of carboxymethyl cellulose ("CELLOGEN HH" manufactured by Daiichi Kogyo Seiyaku Co., Ltd.) was added, and then they were stirred with a TK Homomixer at 5,000 rpm for 1 minute at 25° C., to obtain a dispersion (X6-2). The viscosity of the (X6-2) was 6,200 mPa·s. Further, 0.01 part of cellulase ("Cellulase AP3" manufactured by Amamo Enzyme Inc.) was added, and the resulting mixture was stirred for 3 minutes at 25° C., to obtain a dispersion (X6-3). The viscosity of the (X6-3) was 20 mPa·s. The (X6-3) was charged into a vessel equipped with a stirrer and a thermometer, and removal of solvent was carried out for 2 hours at 30° C., to obtain a dispersion (X6-4).

100 parts of the (X6-4) was centrifuged. After addition of 50 parts of water, solid-liquid separation was carried out by centrifugation, and this process was repeated twice. After drying for 12 hours at 36° C., resin particles (Y-6) were obtained. The physical properties of the (Y-6) are shown in Table 2.

Example 7

682 parts of the polyester (1), 120 parts of the urethane prepolymer (2), and 5.5 parts of the curing agent (2) obtained in Production Examples 7 to 9, respectively were placed in a vessel, and they were stirred with a TK Homomixer (manufactured by Tokushu Kika Kogyo Co., Ltd.) at 5,000 rpm for 1 minute. 1,200 parts of the water phase (1) obtained in Production Example 6 was added to the vessel, and the resulting mixture was stirred with a TK Homomixer at 11,000 rpm for 1 minute, to obtain an aqueous dispersion (X7-1).

To 100 parts of the aqueous dispersion (X7-1), 150 parts of water was added, and then 6 parts of carboxymethyl cellulose ("CELLOGEN HH" manufactured by Daiichi Kogyo Seiyaku Co., Ltd.) was added. Then, they were stirred with a TK Homomixer at 6,000 rpm for 2 minutes at 25° C., to obtain a dispersion (X7-2). The viscosity of the (X7-2) was 5,800 mPa·s. Further, 0.015 part of cellulase ("Cellulase AP3" manufactured by Amano Enzyme Inc.) was added, and the resulting mixture was stirred for 3 minutes at 25° C., to obtain a dispersion (X7-3). The viscosity of the (X7-3) was 20 mPa·s. The (X7-3) was charged into a vessel equipped with a stirrer and a thermometer, and then removal of solvent was carried out for 2 hours at 30° C. After completion of removal of solvent, maturing was carried out for 4 hours at 40° C., to obtain a dispersion (X7-4). The volume median particle diameter and the number median particle diameter of the (X7-4) were 5.13 μm and 4.63 m, respectively, which were measured using a Multisizer III. 100 parts of the (X7-4) was centrifuged. After addition of 50 parts of water, solid-liquid separation was carried out, and this process was repeated twice. After drying for 24 hours at 40° C., resin particles (Y-7) were obtained. The physical properties of the (Y-7) are shown in Table 2.

Comparative Example 1

In a beaker, 140 parts of the urethane prepolymer (1) and 5 parts of the curing agent (1) were mixed, and then 465 parts of water and 3 parts of dodecylnaphthalenesulfonic acid sodium salt were added thereto. Then, they were mixed with an Ultra-disperser (manufactured by Yamato Scientific Co., Ltd.) at 9,000 rpm for 20 minutes at 25° C., to obtain an aqueous dispersion (HX1-1).

100 parts of the (HX1-1) was centrifuged. After addition of 40 parts of water, solid-liquid separation was carried out by centrifugation, and this process was repeated twice. After, drying for 1 hour at 35° C., resin particles (HY-1) were obtained. The physical properties of the (HY-1) are shown in Table 2.

Comparative Example 2

In a beaker, 150 parts of the urethane prepolymer (1), 6 parts of the curing agent (1), and 40 parts of ethyl acetate were mixed, and then 457 parts of the dispersion (1) was added. Then, they were stirred with a TK Homomixer (manufactured by Tokushu Kika Kogyo Co., Ltd.) at 12,000 rpm for 1 minute at 25° C., to obtain an aqueous dispersion (HX2-1).

100 parts of the (HX2-1) was centrifuged. After addition of 40 parts of water, solid-liquid separation was carried out by centrifugation, and this process was repeated twice. After drying for 1 hour at 35° C., resin particles (HY-2) were obtained. The physical properties of the (HY-2) are shown in Table 2.

TABLE 1

|  | Examples | | | | |
| --- | --- | --- | --- | --- | --- |
|  | 1 | 2 | 3 | 4 | 5 |
| Resin particles | (Y-1) | (Y-2) | (Y-3) | (Y-4) | (Y-5) |
| Shape factor (SF-1) | 168 | 170 | 171 | 185 | 189 |
| Volume average particle diameter of resin particles (μm) | 5.9 | 6.0 | 89 | 7.3 | 6.4 |
| Average of surface roughness (Ra) (μm) | 0.20 | 0.17 | 0.55 | 0.19 | 0.22 |
| BET specific surface area (m²/g) | 3.2 | 3.0 | 2.3 | 3.5 | 3.9 |

TABLE 2

|  | Example | | Comparative Example | |
| --- | --- | --- | --- | --- |
|  | 6 | 7 | 1 | 2 |
| Resin particles | (Y-6) | (Y-7) | (HY-1) | (HY-2) |
| Shape factor (SF-1) | 190 | 180 | 102 | 103 |
| Volume average particle diameter of resin particles (μm) | 5.8 | 5.1 | 7.4 | 7.1 |
| Average of surface roughness (Ra) (μm) | 0.16 | 0.12 | 0.63 | 0.21 |
| BET specific surface area (m²/g) | 2.4 | 1.1 | 2.4 | 4.1 |

INDUSTRIAL APPLICABILITY

1. According to the preparing method of resin particles of the present invention, it is possible to reduce the time for deforming resin particles. Further, the deformed resin particles have excellent shape stability. Furthermore, since the preparing method of the present invention is carried out in an aqueous medium, it is very safe as compared with conventional methods.

2. The resin particles obtained by the preparing method of the present invention are not spherical particles (but are spindle or rod-shaped particles) so that they can have a very large surface area. Further, the resin particles of the present invention have a uniform particle diameter and excellent powder fluidity and storage stability.

Therefore, the resin particles of the present invention provide the following effects.

Since the resin particles of the present invention are spindle or rod-shaped particles (that is, the SF-1 thereof ranges from 110 to 800), they show significant thixotropy when dispersed in a solvent or an aqueous medium. For this reason, the resin particles of the present invention can be suitably used as a fluidity improver for paint or coating materials.

Further, the alignment of the resin particles in the formation of a coating layer is uniform in the direction of longer diameter of the resin particles. Therefore, the resin particles of the present invention provide the effect of preventing blister from occurring in forming a coating layer and the effect of improving luster or a gloss of a coating.

Furthermore, in a case where the resin particles of the present invention are blended in cosmetics such as lipstick and foundation, they provide smooth feeling when such cosmetics are applied to the skin.

Moreover, in a case where the resin particles of the present invention are used as a toner, cleaning of the toner with a cleaning blade is facilitated.

The invention claimed is:

1. A method for preparing non-spherical resin particles, comprising the steps of:
   applying a shear force to an aqueous dispersion (II) with increased viscosity formed by adding a thickener (V) to an aqueous dispersion (I) containing resin particles (A); and
   decreasing the viscosity of the aqueous dispersion obtained by the step described above by adding a viscosity decreasing agent (E); and
   subjecting the aqueous dispersion obtained by the viscosity decreasing step described above to solid-liquid separation to remove the aqueous medium, wherein the viscosity decreasing agent (E) is α-glycanase and/or β-glycanase, and wherein the viscosity of the aqueous dispersion (II) is in the range of 300 to 100,000 mPa·s (at 25° C.) and the viscosity of the aqueous dispersion after subjecting the viscosity decreasing step is 200 mPa·s or less (at 25° C.).

2. The method according to claim 1, wherein the thickener (V) is at least one of naturally-occurring, semisynthetic, and synthetic water-soluble polymers.

3. The method according to claim 2, wherein the thickener (V) is at least one selected from the group consisting of acrylic acid-based (co)polymer salts, vinyl ether-based (co) polymers, and cellulose-based semisynthetic polymers.

4. The method according to claim 1, wherein the resin particles (A) comprises at least one resin selected from the group consisting of vinyl resins, polyurethanes, epoxy resins, and polyesters.

5. A method for preparing non-spherical resin particles, comprising the steps of:
applying a shear force to an aqueous dispersion (II) with increased viscosity formed by adding a thickener (V) to an aqueous dispersion (I) containing resin particles (A); and
decreasing the viscosity of the aqueous dispersion obtained by the step described above, wherein the aqueous dispersion (I) is a product obtained by reacting an reactive group-containing prepolymer (α) With a curing agent (β) in an aqueous medium; and
subjecting the aqueous dispersion obtained by the viscosity decreasing step described above to solid-liquid separation to remove the aqueous medium, wherein the viscosity of the aqueous dispersion (II) is in the range of 300 to 100,000 mPa·s (at 25° C.) and the viscosity of the aqueous dispersion after subjecting the viscosity decreasing step is 200 mPa·s or less (at 25° C).

6. The method according to claim 5, wherein the reactive group-containing prepolymer (α) has at least one reactive group selected from the group consisting or an isocyanate group, a blocked isocyanate group and an epoxy group, and the curing agent (β) is an active hydrogen-containing compound (β1) that may be blocked with a removable compound.

7. The method according to claim 6, wherein the active hydrogen-containing compound (β1) that may be blocked with a removable compound is a ketimine compound and/or water.

8. A resin particle (B) obtained by the method comprising the steps of:
applying a shear force to an aqueous dispersion (II) with increased viscosity formed by adding a thickner (V) to an aqueous dispersion (I) containing resin particles (A);
decreasing the viscosity of the aqueous dispersion obtained by the step described above; and
subjecting the aqueous dispersion obtained by the viscosity decreasing step described above to solid-liquid separation to remove the aqueous medium, wherein the viscosity of the aqueous dispersion (II) is in the range of 300 to 100,000 mPa·s (at 25° C.) and the viscosity of the aqueous dispersion after subjecting the viscosity decreasing step is 200 mPa·s or less (at 25° C.), which has a shape factor (SF-1) of 110 to 800.

9. The resin particle (B) according to claim 8, which can be used as additives for paints, additives for coating materials, powder coatings, additives for cosmetics, resins for slush molding, spacers for use in manufacturing electronic components or devices, standard particles for electronic measuring instruments, toners for electrophotography, toners for electrostatic recording, toners for electrostatic printing, and hot-melt adhesives.

* * * * *